US012584749B2

(12) United States Patent
Magnuson et al.

(10) Patent No.: US 12,584,749 B2
(45) Date of Patent: Mar. 24, 2026

(54) SYSTEMS, APPARATUS AND METHODS FOR AIRCRAFT FLIGHT PLANNING AND EFFICIENT COMMUNICATIONS WITH AIRCRAFT

(71) Applicant: APiJET, LLC, Seattle, WA (US)

(72) Inventors: Brian Robert Magnuson, Spokane Valley, WA (US); John Lucien David Young, Glorieta, NM (US); Robert D. Green, Seattle, WA (US)

(73) Assignee: APiJET, LLC, Seattle, WA (US)

( * ) Notice: Subject to any disclaimer, the term of this patent is extended or adjusted under 35 U.S.C. 154(b) by 106 days.

(21) Appl. No.: 18/790,047

(22) Filed: Jul. 31, 2024

(65) Prior Publication Data

US 2025/0093161 A1 Mar. 20, 2025

Related U.S. Application Data

(60) Provisional application No. 63/538,919, filed on Sep. 18, 2023.

(51) Int. Cl.
G01C 21/20 (2006.01)
(52) U.S. Cl.
CPC .................................... G01C 21/20 (2013.01)
(58) Field of Classification Search
CPC .................................................. G01C 21/20
See application file for complete search history.

(56) References Cited

U.S. PATENT DOCUMENTS

| | | | |
|---|---|---|---|
| 7,099,753 | B2 | 8/2006 | Gvillo |
| 7,203,630 | B2 | 4/2007 | Kolb et al. |
| 7,584,032 | B2 | 9/2009 | Bauman et al. |

(Continued)

FOREIGN PATENT DOCUMENTS

| | | |
|---|---|---|
| AU | 2013359159 B2 | 7/2017 |
| EP | 2348285 A2 | 7/2011 |

(Continued)

OTHER PUBLICATIONS

European Search Report mailed Jun. 20, 2025 in EP App No. 24200231.9, 18 pages.

(Continued)

*Primary Examiner* — Aryan E Weisenfeld
(74) *Attorney, Agent, or Firm* — Cozen O'Connor

(57) ABSTRACT

Flight planning and/or optimizing flight plans can be performed using ground-based systems with little or no instrumented data, providing efficient communications between aircraft and ground-based systems. Estimates of airspeeds (i.e., derived airspeed) can be derived from transponder telemetry, which is optionally collected independently of flight planning. Alternative (adjusted or revised or modified) flight plans can be generated based on derived airspeed, weather, traffic, etc., and/or performance data specific to an individual aircraft. Aircraft performance models can be updated (e.g., fuel consumption) based on monitoring an aircraft over time. Winds aloft data can be updated based on monitoring of one or more aircraft. Data can be selectively identified and uplinked to aircraft based on certain criteria (e.g., data relevant to geographic areas and altitudes proximate flight path as indicated by flight plan).

28 Claims, 11 Drawing Sheets

(56) References Cited

U.S. PATENT DOCUMENTS

| | | | |
|---|---|---|---|
| 8,132,155 | B2 | 3/2012 | Gvillo |
| 8,818,696 | B2 | 8/2014 | Klooster et al. |
| 8,903,571 | B2 | 12/2014 | Kirk |
| 8,977,482 | B2 | 3/2015 | Ballin et al. |
| 9,037,319 | B2 | 5/2015 | Conner et al. |
| 9,126,696 | B1 | 9/2015 | Hampel et al. |
| 9,177,479 | B2 | 11/2015 | Castillo-effen et al. |
| 9,511,877 | B2 | 12/2016 | Masson |
| 9,652,517 | B2 | 5/2017 | Mallasch et al. |
| 9,852,643 | B1 | 12/2017 | Borgyos |
| 9,881,507 | B2 | 1/2018 | Rencher et al. |
| 9,958,573 | B2 | 5/2018 | Stulken et al. |
| 10,074,283 | B1 | 9/2018 | De Oliveira et al. |
| 10,102,756 | B2 | 10/2018 | Burke et al. |
| 10,573,186 | B2 | 2/2020 | Venkataramana et al. |
| 11,042,150 | B2 | 6/2021 | Hansman et al. |
| 11,720,585 | B1 | 8/2023 | Mallasch et al. |
| 2008/0215204 | A1 | 9/2008 | Roy et al. |
| 2010/0042275 | A1 | 2/2010 | Kirk |
| 2012/0245834 | A1 | 9/2012 | Klooster et al. |
| 2014/0075506 | A1 | 3/2014 | Davis et al. |
| 2014/0277853 | A1 | 9/2014 | Castillo-effen et al. |
| 2014/0330458 | A1* | 11/2014 | Meulle .................. G01P 5/00 701/14 |
| 2015/0088342 | A1 | 3/2015 | Conner et al. |
| 2015/0324501 | A1 | 11/2015 | Desell et al. |
| 2016/0133137 | A1 | 5/2016 | Rencher et al. |
| 2016/0358480 | A1* | 12/2016 | Kang .................. G08G 5/34 |
| 2017/0345318 | A1 | 11/2017 | Kim et al. |
| 2017/0372622 | A1 | 12/2017 | Borgyos |
| 2018/0286254 | A1 | 10/2018 | Westervelt et al. |
| 2019/0041233 | A1 | 2/2019 | Duerksen |
| 2020/0233439 | A1 | 7/2020 | Ivanov et al. |
| 2021/0005093 | A1 | 1/2021 | Dunsdon et al. |
| 2021/0383706 | A1 | 12/2021 | Gibbons et al. |
| 2021/0383708 | A1 | 12/2021 | Gibbons et al. |
| 2022/0013019 | A1 | 1/2022 | Root et al. |

FOREIGN PATENT DOCUMENTS

| | | |
|---|---|---|
| WO | 2008153597 A1 | 12/2008 |
| WO | 2021247980 A1 | 12/2021 |
| WO | 2021247985 A1 | 12/2021 |

OTHER PUBLICATIONS

Partial European Search Report for EP 24200231.9-1009 dated Mar. 10, 2025, 20 pages.

EP Search Report mailed Sep. 8, 2025 in EP App No. 25180498.5. 12 pages.

International Searching Authority of the PCT; Notification of Transmittal of the International Search 1 Report and the Written Opinion of the International Searching Authority; PCT Application No. PCT/US21/35882 filed Sep. 8, 2021.

Karr et al., "Point-Mass Aircraft Trajectory Prediction Using a Hierarchical, Highly-Adaptable Software Design", American Institute of Aeronautics and Astronautics, https://ntrs.nasa.gov/search. jsp?R=20170005766 2019-04.

Wing et al., "The TASAR Project: Launching Aviation on an Optimized RouteToward Aircraft Autonomy", NASA/TP—2019-220432.

\* cited by examiner

SYSTEMS, APPARATUS AND METHODS FOR AIRCRAFT FLIGHT PLANNING AND EFFICIENT COMMUNICATIONS WITH AIRCRAFT

CROSS-REFERENCE TO RELATED APPLICATIONS

This applications claims benefit under 35 U.S.C. 119(e) to U.S. provisional patent application No. 63/538,919 filed Sep. 18, 2023, which is incorporated herein by reference, in its entirety.

TECHNICAL FIELD

The present disclosure relates generally to systems, apparatus, methods and/or articles related to aircraft flight planning, reduction in fuel consumption, other optimizations, and to efficient communications with aircraft where, for example, communications resources are limited or expensive.

BACKGROUND

Description of the Related Art

Flight planning generates flight plans, and can generate flight plans that optimize flight trajectories, for example taking into account weather, restricted airspace, other aircraft, and other potential hazards. A flight plan comprises a sequence of waypoints, which are typically specified by latitude and longitude and have associated three to five letter names. The flight plan can include specifics of altitude, airspeed, and anticipated winds (e.g., velocity and direction). It may be desirable to change a flight plan in-flight to take into account variable conditions (e.g., variations in forecast winds, weather, air traffic, restricted airspace, turbulence). Revised or modified or adjusted flight plans can be generated to, for example, minimize fuel consumption, avoid turbulences, avoid convective weather systems, avoid other air traffic or aircraft, and/or avoid restricted airspace.

The National Aeronautics and Space Agency (NASA) developed a processor-based system to calculate or determine flight plans and revisions, modifications or adjustments to flight plans (e.g., optimizations) which is denominated as Traffic Aware Strategic Aircrew Requests (TASAR) system. TASAR is typically made available to a flight crew via their Electronic Flight Bag (EFB) system. As envisioned, the TASAR system includes a software application which runs via an on-board processor-based device (e.g., software application loaded on and operated via a tablet computer (e.g., iPad®)), a configuration component, a ground-based server computer system, and other ground-based services. The various components of TASAR operate to plan a flight plan or revisions, modifications or adjustments to a flight plan that preferably optimize the flight (e.g., set of way points, altitudes, trajectory) according to various parameters which may be the subject of the optimization (e.g., fuel consumed, avoiding convective weather systems, avoiding turbulence, avoiding other air traffic). The TASAR can take into account other aircraft and their respective intent (e.g., based on the other aircraft's position and orientation), for example, taking in account of lateral and vertical spacing at various instance of time with respect to other aircraft), and thus TASAR can thus constitute what is referred to as a Traffic Aware Planner (TAP). The TASAR system is described in a document entitled "Traffic Aware Strategic Aircrew Requests (ASA), Traffic Aware Planner (TAP), Interface Control Document (ICD) contained in the Appendix to U.S. provisional patent application No. 63/035,149, titled "System and Method for Community Provided Weather Updates for Aircraft" filed Jun. 5, 2020. Additional information about TASAR can be found in International Patent application Publication No. WO2021/237985 and on-line from NASA as well as from other sources.

The TASAR system includes an automated on-board component that monitors data and sensor feeds and determines potential improvements to the flight plan, and presents these proposed changes (i.e., revisions, modifications or adjustments) to the flight plan to the flight crew for consideration. In doing so, the changes to the flight plan are evaluated for potential conflicts with known aircraft traffic, known weather hazards, known turbulence, and known airspace restrictions, all of which require the up-linking of copious amounts of information to the aircraft. Actual route changes must be submitted to Air Traffic control for authorization, and in many instances also submitted to the carrier airline that operates the particular aircraft for approval. The TASAR system is designed to improve the process by which pilots request flight plan changes (e.g., alternatives, revisions, modifications or adjustments to flight path and/or altitude) to efficiently accommodate changes in flight conditions. Such can, for example, be used to decrease fuel consumption, and/or to improve other flight characteristics as specified by the carrier airline that operates the aircraft (in the case of a commercial flight) or other specified by another entity.

Flight path specification or optimization can be a function of various parameters including various characteristics of the aircraft. For example, the structural configuration (e.g., different shapes, sizes, structures, tail design, wing design, presence or absence of winglets, different engine configurations) for a given make and model of aircraft can have a substantial effect on fuel consumption, as well as on other performance characteristics of an aircraft. Additionally, even for a specific individual aircraft (e.g., unique "tail number"), the age and total number of cycles (e.g., takeoffs and landings, pressurizations), the performance characteristics of the aircraft can change substantially over time.

BRIEF SUMMARY

As is apparent from the above background discussion, much of the information that can be employed in flight planning and, or optimizing flight plans, resides in ground-based processor-based systems and, or, ground-based repositories. Such information may be useful in generating flight plans or generating alternative flight plans (e.g., revised or modified or adjusted or otherwise changed or updated flight plans) that are optimized to reduce one or more operational costs and, or while taking into account various other parameters. Fuel consumption is a significant operational cost for almost all aircraft operations. Reducing fuel consumption not only advantageously reduces the monetary cost associated with purchasing aviation fuel, but can also advantageously reduce a carbon footprint associated with each flight, as well as increase energy independence for countries in which flights are operated.

Alternative flight plans (e.g., revised or modified or adjusted flight plans) can be generated to, for example, to one or more of: minimize fuel consumption, avoid turbulences, avoid convective weather systems, avoid turbulence, avoid other air traffic or aircraft, reduce overall flight time or transit time, lengthen a flight or transit time or a portion thereof where an aircraft has been instructed to not reach a given waypoint before a specified time based on imposed delays by air traffic control, maximize on time departures, maximize on time arrivals, minimize a total number of missed connections, minimize overall cost of operation for a carrier airline, and/or to improve other specified flight characteristics. Some of the performance characteristics or optimization rules (e.g., weighting assigned to various variables or parameters) can be specified by a carrier airline that operates the particular aircraft (in the case of a commercial flight) or by another entity.

As alluded to above, communications (e.g., up-linking, down-linking) with aircraft during a flight may be severely limited, complicated and, or expensive. This is particularly a problem with older aircraft, but persists even with many new aircraft that may lack passenger connectivity services.

While most aircraft are equipped for communications with ground-based systems, many legacy systems are disconnected from one another and/or have severely limited bandwidth. Thus communications (e.g., uplinks from ground-based systems to aircraft; downlinks from aircraft to ground-based systems) is often bandwidth limited, and can be complicated and, or can be costly (e.g., satellite communications links). For instance, it may be particularly difficult or even impossible for ground-based systems to obtain instrumented data (e.g., pitot static tube readings or airspeed) from aircraft sensors and on-board equipment.

Today most aircraft are equipped with transponders. The transponders transmit (i.e., squawk) a limited set of information, either in response to an interrogation or periodically. The set of information transmitted by a transponder may be specified by a given authority (e.g., Federal Aircraft Administration (FAA)) and/or may be specified by a particular type of aircraft operation (e.g., commercial or private) and/or by a particular airspace in which the aircraft operates. Most aircraft operating in the United States (USA) with transponders employ "C" mode or "S" mode operation, which transmit or squawk global navigation location (e.g., Global Positioning System (GPS)) coordinates, pressure altitude and a unique identifier that is unique to the individual aircraft. Other countries have similar provisions. Transponder telemetry can, for example, be collected from appropriately equipped aircraft, stored and accessed via the ground-based Automatic Dependent Surveillance-Broadcast (ADS-B) services. For flights in the United States, ground-based ADS-B data can provide information including geographic coordinates, altitude, and unique aircraft identifier. This same information is also often made available via various ground-based services (e.g., FlightAware, ADSB Exchange, FlightRadar24, RadarBox, etc.).

In at least some implementations, information collected from transponders via a ground-based system is advantageously employed to generate or derive at least an estimate of airspeed (i.e., derived airspeed) of an aircraft at various times during one or more flights. Such can, for example, employ global navigation coordinates which may represent ground locations, and time-stamps to determine a ground speed of the aircraft. Such can, for example, employ weather data, for example a three-dimensional atmospheric wind model which represents wind speeds and wind directions (e.g., winds aloft), and which also represents barometric pressures and atmospheric temperatures, all at various geographic locations and at various altitudes at those geographic locations. Hence, the three-dimensional atmospheric wind model includes forecasted winds aloft data (e.g., forecasted wind speed and direction at various altitudes). Alternative, such can less advantageously employ a winds aloft data product (e.g., from NOAA) that does not include barometric pressures or atmospheric temperatures. Such can, for example, employ even employ adjusted weather data or adjusted winds aloft data. The winds aloft data is employed along with the determined ground speed to determine at least an estimate of airspeed and heading of the aircraft at various instances of time or at various locations or points along a flight path of the aircraft. Such can also take into account performance characteristics of an aircraft, or even the performance characteristics of a specific individual aircraft, to improve the at least approximation of airspeed and heading.

In at least some implementations, a generated or derived at least approximate airspeed of an aircraft is employed to generate an adjusted or revised or modified flight plan. The alternative flight plan (e.g., adjusted or revised or modified flight plan) may be generated to optimize one or more parameters (e.g., minimize fuel consumption, avoid turbulences, avoid other air traffic or aircraft, avoid convective weather systems, avoid turbulence, reduce transit time or even lengthen transit time where an aircraft has been instructed to not reach a given waypoint before a specified time (e.g., delay imposed by air traffic control), minimize a total number of missed connections, minimize overall cost of operation for a carrier airline). Some of the rules can be specified by an airline that operates the particular aircraft.

In order to generate an optimized (e.g., optimized, but not necessarily optimal) flight plan or optimized alternative flight plan (e.g., adjusted or revised or modified flight plan), a system should account for the specific aircraft performance characteristics of the individual aircraft, not only the make and model of the particular aircraft, but also the specific configuration of the specific individual aircraft and even the effect of age or current length of service of the specific individual aircraft on aircraft performance.

Various implementations described herein can advantageously employ aircraft specific models and/or aircraft specific fuel consumption models and/or fuel consumption parameters. These aircraft specific models, fuel consumption models and/or fuel consumption parameters are specific to an individual aircraft, representing: a make and model of aircraft, a specific structural configuration of aircraft (e.g., different shapes, sizes, structures, tail design, wing design, presence or absence of winglets, different engine configurations) and even optionally representing an effect of an age of the specific individual aircraft and, or a total number of cycles (e.g., takeoffs and landings, pressurizations) that the specific individual aircraft has experienced over is life. These various aircraft specific characteristics or parameters is strongly correlated with fuel consumption, which is also strongly correlated with aircraft weight, air speed, pressure altitude and air temperature, for example as represented by a cost function. Fuel consumption is a significant factor in operating cost and environmental impact, particularly for aircraft that consume conventional combustible liquid fuels (e.g., aviation gas, jet fuel or refined kerosene). Consequently, it would be advantageous to verify that an aircraft model, fuel consumption model or fuel consumption parameter is correct, and, or to correct, adjust, or otherwise revise the aircraft model, fuel consumption model or fuel consumption parameter accordingly.

In some implementations, fuel consumption can be calculated or derived using an aircraft performance model or fuel consumption model or fuel consumption parameter over a plurality of flights, and even over a plurality of times per flight for a specific individual aircraft. The calculated or derived fuel consumption can be compared to an actual or measured fuel consumption. Notably, fuel consumption can be represented by weight or more accurately by change in weight. The weight of an aircraft is largely fixed except for the weight of fuel, which varies during flight as fuel is consumed. At least one processor can compare a change in calculated or derived weight, that was derived via an aircraft performance model or fuel consumption model or fuel consumption parameter, with a change in actual, instrumented or measured weight (e.g., as represented by measured fuel volume) to identify any discrepancy therebetween, and adjust an aircraft performance model or fuel consumption model or fuel consumption parameter accordingly to eliminate or at least reduce the discrepancy. The aircraft performance model can represents one or more of: an engine configuration, a thrust, a drag for the specific individual aircraft, and which represents a current age or number of pressurization cycles or take offs or landings experienced by the specific individual aircraft.

It is noted that for less conventional aircraft which employ electrical energy storage (e.g., chemical batteries, super- or ultra-capacitors), fuel consumption is generally not significant to aircraft weight, and aircraft weight will generally not change during a flight. Thus, for electric powered aircraft change in weight tends to be significant to aircraft, although aircraft performance will still be correlated with total weight of the aircraft. The teachings herein can be readily applied to electric powered aircraft, typically by treating the weight of the aircraft as constant over a flight. Additionally, the teachings herein may be modified to take into account and/or place limits on current draw from the electrical energy storage (e.g., chemical batteries, super- or ultra-capacitors).

Winds aloft data also has a significant impact of flight planning and on operational efficiency of aircraft. Most carrier airlines rely on forecasted winds aloft data, for example forecasted winds aloft data provide by the National Oceanic and Atmospheric Administration (NOAA) and made accessible via NOAA's ground-based systems and/or a more robust or detailed three-dimensional weather model. In at least some implementations, winds aloft data is adjusted (i.e., adjusted winds aloft data) based on variations or discrepancy identified in wind conditions actually experienced by aircraft in a defined vicinity, at a defined range of altitudes, and in a defined range of times. The variation or discrepancy can be determined from discrepancies in derived airspeeds experienced by various aircraft in the vicinity of one another in a defined time period, for instance where a pattern exists (e.g., derived airspeeds for one or more aircraft indicate that the winds aloft are incorrect by roughly the same amount, e.g., approximately the same magnitude and direction, for instance as represented by respective vectors). The variation or discrepancy can be determined from discrepancies in expected or predicted fuel consumption and actual or measured fuel consumption. Alternatively, variations or discrepancies can be determined from discrepancies between derived airspeeds and instrumented airspeeds when instrumented airspeed are available. Adjusted winds aloft data can advantageously be employed in subsequent determinations of derived airspeed and, or to generated alternative flight plan (e.g., revised or modified or adjusted flight plans), improving operating efficiency of the aircraft.

In at least some implementations, a subset of data of each of a respective type of data of a plurality of types of data can be identified to be uplinked to the particular aircraft, for example based at least in part on a flight plan. Types of data can, for example, include one or more of: convective weather data, air traffic, turbulence, restricted airspace data, winds aloft data or winds aloft data derived from a three-dimensional weather model, or adjusted winds aloft data. The identified subset of data can be based at least in part on a filed flight plan or a revised or updated or otherwise alternative flight plan (e.g., during the corresponding flight). For example, data relevant to an area or region within a defined distance along the flight path of the particular aircraft may be uplinked to the aircraft while other data of the same type not uplinked to the aircraft. Also, for example, data relevant to an altitude or set of altitudes specified by the flight plan or the alternative flight plan of the particular aircraft may be uplinked to the aircraft while other data of the same type not uplinked to the aircraft. Such can account for a current position of the aircraft, for example to select data to uplink for areas or regions and altitudes at or downstream of a current position along the flight plan, while data for regions and altitudes upstream of the current position along the flight plan or the alternative flight plan at a given time is not uplinked.

Thus, at least some aspects of this application can be summarized as accurately deriving approximate flight characteristics (e.g., airspeed heading, Mach speed) for a specific aircraft by a ground-based system using location and altitude information, which is advantageously performed with minimal to no access to instrumented data from the aircraft (e.g., relying on GPS data or transponder data; determining ground speed based on same; determining airspeed and heading based on determined ground speed, heading, tail number specific aircraft performance data and winds aloft data). The location and altitude data advantageously represent actual physical locations and altitudes of an aircraft in flight, as opposed to representing an "intended flight plan" or a "simulated flight plan." The location and altitude data may advantageously be derived from non-instrumented data (e.g., global positioning data such as GPS or GNSS data, winds aloft data) rather than being instrumented data sensed or collected by aircraft specific or aircraft dedicated instruments (e.g., airspeed indicators, altimeters, vertical speed indicators, attitude indicators, heading indicators, turn and bank indicators, engine instruments) aboard the particular aircraft and downloaded from the aircraft to the ground-based system(s). The non-instrumented data used by the ground-based system(s) can, for example take the form of real time or almost real time data, for instance a stream of 3D points and winds aloft data. Again, this may advantageously reduce expensive and complicated communications between the aircraft and the ground. Thus, derivation of the air data (TAS/CAS, Mach, etc.) can advantageously be based purely on the GPS/GNSS data and/or winds aloft data and/or from any similar computations that may happen in the cockpit.

In at least some implementations, a ground-based system can also determine an Inferred Cost Index (ICI) or Derived Cost Index based on the derived approximate flight characteristics.

The above are just a few of the inventive aspects described herein and are not intended to be limiting nor necessarily complete statements of any inventive concept.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with aircraft, avionics, wireless transponders, computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The terms "revised" and "modified" and "adjusted" are used interchangeably in this specification and the appended claims. The terms "revising" and "modifying" and "adjusting" are used interchangeably in this specification and the appended claims. The terms "revision" and "modification" and "adjustment" are used interchangeably in this specification and the appended claims.

The headings and Abstract of the Disclosure provided herein are for convenience only and do not interpret the scope or meaning of the implementations.

Figure 1:
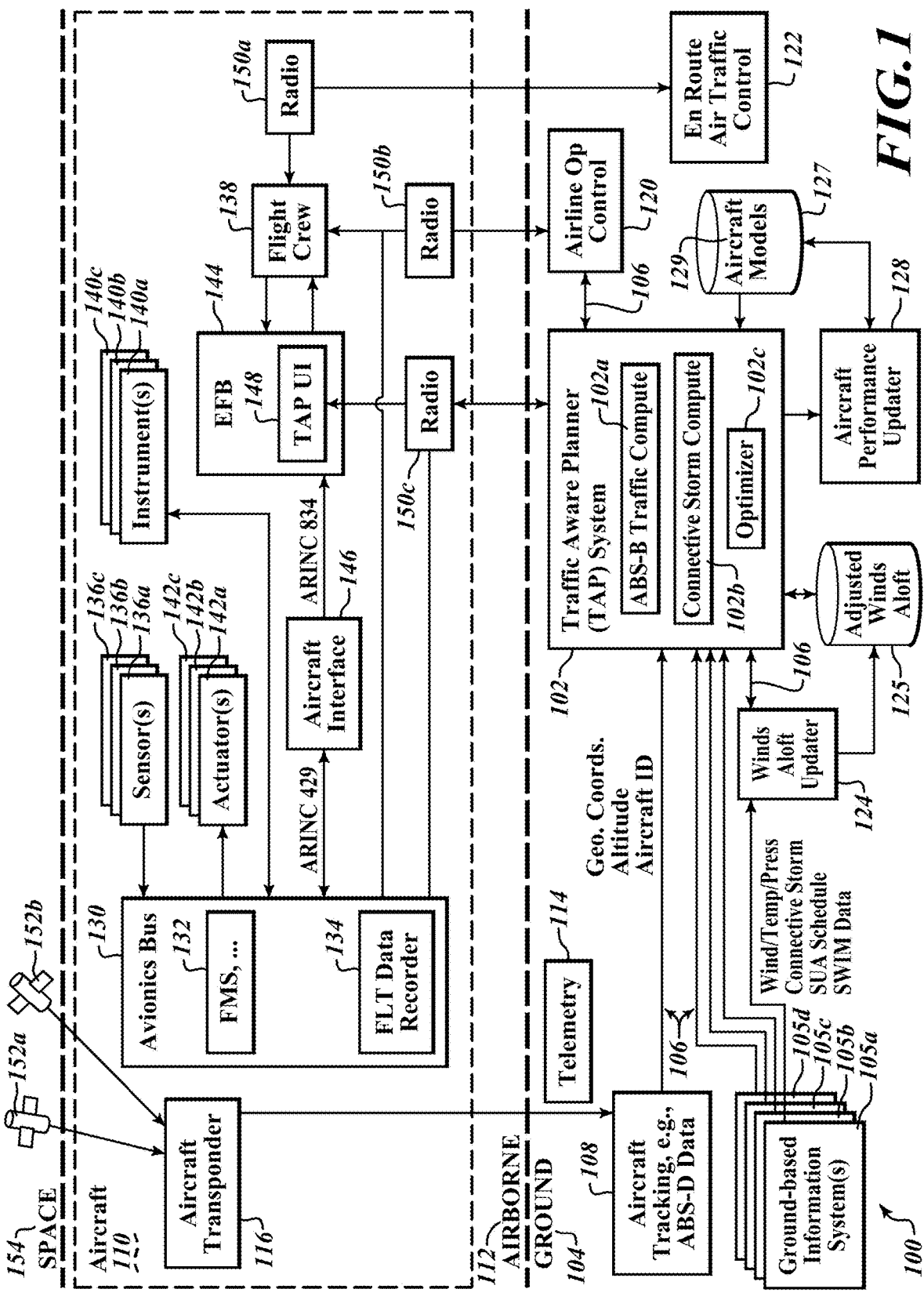
FIG. 1 is a schematic diagram of an environment for aircraft flight planning, aircraft performance model adjustment and/or winds aloft adjustment, in which some components reside on aircraft, some reside on the ground, and which can implement flight planning, adjustments to winds aloft data and, or adjustments to aircraft specific mode, and which can realize more efficient communications with aircraft then via conventional approaches, according to at least one illustrated implementation.

FIG. 1 shows an environment 100 for aircraft flight planning, aircraft performance model adjustment and/or winds aloft adjustment, in which some components reside on the aircraft either in avionics or communication terminal services, and some reside on the ground, and some interact with satellites, and which can realize more efficient communications with aircraft then via conventional approaches, according to at least one illustrated implementation.

In particular, FIG. 1 shows a traffic aware planner (TAP) processor-based system 102. The TAP processor-based system 102 is preferably ground-based, for example taking the form of one or more computers systems located on the ground 104, for example in fixed ground facilities.

The TAP processor-based system 102 is communicatively coupled to one or more ground-based information systems 105a, 105b, 105c, 105d (four shown) via one or more conventional communications channels 106 (e.g., local area networks, wide area networks, wired networks, wireless networks, Ethernet, Internet, extranets), which typically are high or relatively high bandwidth communications channels. For example, the TAP processor-based system 102 is communicatively coupled to one or more ground-based forecasted weather information systems 105a that provides forecasted weather (e.g., three-dimensional weather model that includes forecasted winds aloft, forecasted winds aloft data, temperature data for various altitudes, barometric pressure for various altitudes, turbulence), which can, for instance be provided by ADDS operated by the Aviation Weather Center (AWC) of the National Oceanic and Atmospheric Administration (NOAA); or by a commercial ground-based service (e.g., Weather Services International (WSI), FlightWX by BCI, Inc.). Also for example, the TAP processor-based system 102 is communicatively coupled to one or more ground-based convective weather information systems 105b that provides convective weather or storm information (e.g., geographic locations, altitudes, severity) and/or turbulence information. Also, for example, the TAP processor-based system 102 is communicatively coupled to one or more ground-based 105c Special Use Airspace (SUA) information systems, for example a SUA information system provided and operated by the FAA. Also for example, the TAP processor-based system 102 is communicatively coupled to one or more ground-based air traffic management systems, for instance communicatively coupled to one or more System Wide Information Management (SWIM) systems 105d, for example provided and operated by the FAA as part of the National Airspace System (NAS) or provided and operated by Eurocontrol, and/or communicatively coupled to one or more En Route Automation Modernization (ERAM) systems, and/or communicatively coupled to one or more Traffic Alert and Collision Avoidance Systems (TCAS); and/or communicatively coupled to one or more Traffic Information Services Broadcast (TIS-B) systems.

The TAP processor-based system 102 is communicatively coupled to one or more ground-based aircraft tracking processor-based systems 108 via conventional communications channels 106 (e.g., local area networks, wide area networks, wired networks, wireless networks, Ethernet, Internet, extranets), which typically are high bandwidth communications channels. The ground-based aircraft tracking processor-based system(s) 108 tracks aircraft 110 while in flight or airborne 112, typically via transponder telemetry 114. The transponder telemetry 114 originates from aircraft transponders 116 carried by each aircraft 110 (only one shown in FIG. 1). The transponder telemetry 114 can include an indication of spatial or global location (e.g., a set of global navigation coordinates, for instance Global Positioning System (GPS) coordinates), an indication of altitude (e.g., geometric altitude) and a unique identifier that unique identifies the associated aircraft 110 (which may be referred to as a tail number, but which is not limited to being a tail number). The ground-based aircraft tracking processor-based system(s) 108 can receive the transponder telemetry 114 directly, or indirectly, from transponders 116 carried by aircraft 110, and can time stamp each set of transponder telemetry 114. For example, the TAP processor-based system 102 can access telemetry via the Automatic Dependent Surveillance-Broadcast (ADS-B) Exchange operated by the FAA or operated by a commercial entity (e.g., Flight Aware®).

The TAP processor-based system 102 is communicatively coupled to one or more airline operation control processor-based systems 120 via conventional communications channels 106 (e.g., local area networks, wide area networks, wired networks, wireless networks, Ethernet, Internet, extranets), which typically are high bandwidth communications channels. The airline operation control processor-based system(s) 120 is typically ground-based and provides operational control over flights of the various aircraft 110 operated by a respective carrier. Such can, for example, optionally include approving flight plans (e.g., initial flight plan, alternative flight plan (e.g., revised, modified or adjusted flight plans)). Such can, for example, include specifying or providing cost functions. Each carrier airline that operates a particular set of aircraft typically has a respective cost function, with weighted parameters used to assess various operation costs of operating aircraft (e.g., fuel consumption, time in transit or transit time, distance in transit or transit distance, on time departure, on time arrival, number of missed connections), and which can, at least in part, be employed in determining an optimized flight plan or optimized alternative flight plan (e.g., revised, modified or adjusted flight plan). The cost function typically is an output of forward integrating an own ship state along a route (active or optimizer flight plan candidate) using the aircraft performance model, where the weight and, or time projected are the values used for costing. The cost index can be used to determine things like the targeted Mach number, which is provided to the autopilot system to control operation of the aircraft to match the actual airspeed to the targeted Mach number. The airline operation control processor-based system(s) 120 can also provide fuel weight information from position reports, Gate Out, Wheels Off, Wheels On, Gate In (OOOI) messages, flight data monitoring (fmd) messages, as well as filed flight plans that include vertical intent (filed step climbs).

The TAP processor-based system 102 can optionally include and/or execute an ABS-B traffic compute set of processor-executable instructions 102a, that can generate flight plans (e.g., initial flight plan, alternative flight plan (e.g., revised, modified or adjusted flight plans)) that account for airborne traffic. The TAP processor-based system 102 can optionally include and/or execute a convective compute set of processor-executable instructions 102b, that can generate flight plans (e.g., initial flight plan, alternative flight plan (e.g., revised, modified or adjusted flight plans)) that account for convective storms, for example route around convective storms. The TAP processor-based system 102 can optionally include and/or execute an optimizer set of processor-executable instructions 102c, that can generate optimized flight plans (e.g., initial flight plan, alternative flight plan (e.g., revised, modified or adjusted flight plans)) that can optimize over various variables or parameters (e.g., as specified by a carrier airline).

The environment 100 can also include en route air traffic control systems 122, which is typically ground-based. The TAP processor-based system 102 is communicatively coupled to one or more aircraft and the aircraft are communicatively coupled with en route air traffic control systems 122 via conventional communications channels 106 (e.g., local area networks, wide area networks, wired networks, wireless networks, Ethernet, Internet, extranets), which typically are high bandwidth communications channels. One of ordinary skill in the art will appreciate that in at least some instances, one or more available communications channels may be unidirectional. En route air traffic control system(s) 122 controls the routing of all aircraft in a defined airspace, typically approving initial flight plans, as well as changes to flight plans (e.g., alternative flight plan (e.g., revised, modified or adjusted flight plans)) proposed en route (e.g., during a flight). Thus, en route air traffic control system(s) 122 must authorize any changes to the flight plan before the aircrew are allowed to implement an alternative flight plan (e.g., a revised, modified or adjusted flight plan).

Some implementations include one or more winds aloft updater processor-based systems 124, which is typically ground-based. The winds aloft updater processor-based system(s) 124 is communicatively coupled to receive winds aloft data (e.g., forecasted winds aloft data and/or three-dimensional weather model which includes forecasted winds aloft data), for example from one or more ground-based forecasted weather information systems 105a, via conventional communications channels 106 (e.g., local area networks, wide area networks, wired networks, wireless networks, Ethernet, Internet, extranets), which typically are high bandwidth communications channels. The winds aloft updater processor-based system(s) 124 is optionally communicatively coupled to the TAP processor-based system 102 via conventional communications channels 106 (e.g., local area networks, wide area networks, wired networks, wireless networks, Ethernet, Internet, extranets), which typically are high bandwidth communications channels. While the winds aloft updater processor-based system(s) 124 is illustrated as a separate processor-based system from the TAP processor-based system 102, in some implementations the operations of the winds aloft updater processor-based system(s) 124 can be implemented by the TAP processor-based system 102.

As described in more detail herein, the winds aloft updater processor-based system(s) 124 can determine whether discrepancies exist in winds aloft information (e.g., forecasted winds aloft information, previously adjusted winds aloft information, three-dimensional weather model which includes forecasted winds aloft data) and generate adjusted winds aloft information based on real-time or almost real-time assessments (e.g., based on winds being experienced by one or more aircraft in a same general vicinity of one another and a same general altitude of one another and at a same general time as one another). One or more nontransitory storage media 125 (e.g., processor-readable memory, magnetic hard disk drives, optical disk drives, FLASH memory can store winds aloft data and/or three-dimensional weather model which includes forecasted winds aloft data, for example adjusted winds aloft data generated by the winds aloft updater processor-based system(s) 124.

In some implementations, the TAP processor-based system 102 has access (e.g., is communicatively coupled) to a data store of aircraft models or aircraft performance models (e.g., aircraft specific fuel consumption models and/or fuel consumption parameters). Such can, for example, be stored via one or more nontransitory storage media 127 (e.g., processor-readable memory, magnetic hard disk drives, optical disk drives, FLASH memory) to store aircraft performance models or performance data 129. The data store of aircraft performance models or performance data 129 is typically ground based. The aircraft performance models or performance data 129 can be specific to each individual aircraft. For example, the aircraft performance models or performance data 129 are specific to a specific individual aircraft, and represents one or more or all of: a make and model of aircraft, a specific structural configuration of the specific individual aircraft (e.g., different shapes, sizes, structures, tail design, wing design, presence or absence of winglets, different engine configurations) and even representing an effect of an age of the specific individual aircraft and, or a total number of cycles (e.g., takeoffs and landings, pressurizations) that the specific individual aircraft has experienced over is life.

In some implementations, one or more aircraft performance updater processor-based systems 128 is communicatively coupled to the TAP processor-based system 102. The aircraft performance updater processor-based system(s) 128 is typically ground based. The aircraft performance updater processor-based system(s) 128 is communicatively coupled to the one or more nontransitory storage media 127 to access (e.g., read from, write to) the data store of aircraft performance models or performance data 129 via conventional communications channels 106 (e.g., local area networks, wide area networks, wired networks, wireless networks, Ethernet, Internet, extranets), which typically are high bandwidth communications channels.

As described in more detail herein, the aircraft performance updater processor-based system(s) 128 can determine whether discrepancies exist in between modeled performance and actual performance of a specific individual aircraft (e.g., discrepancies in modeled airspeed and actual airspeed; discrepancies in modeled fuel consumption and actual fuel consumption), and generate adjusted aircraft models or aircraft performance models that better reflect the actual experience of the specific individual aircraft. While the aircraft performance updater processor-based system(s) 128 is illustrated as a separate processor-based system from the TAP processor-based system 102, in some implementations the operation of the aircraft performance updater processor-based system(s) 128 can be implemented by the TAP processor-based system 102.

In some implementations a TAP processor-based system can be implemented in an airborne or aircraft-based system (e.g., as part of an electronic flight bag implemented on a processor-based system, for instance a tablet computer system), although such disadvantageously significantly increases the transfer of information or data between ground and aircraft, and in particular significantly disadvantageously increases an amount of information uplinked to the aircraft from the ground-based information systems.

The aircraft 110 can take any of a large variety of form, including commercial, private or military aircraft, fixed wing aircraft, rotary wing aircraft, tilt rotor aircraft, jet engine driven aircraft, propeller driven aircraft or turboprop aircraft to name a few.

The aircraft 110 can have any of a large variety of instrumentation and communications systems. As illustrated, the aircraft 110 includes an avionics bus 130, a flight management system (FMS) 132 and flight data recorder 134. The aircraft 110 also includes a number of sensors, for example, one or more pressure sensors 136a, one or more pitot static tube airspeed sensors 136b, one or more fuel volume sensors 136c, one or more flight control sensors, one or more engine sensors (e.g., fuel flow sensor, turbine inlet temperature sensor, torque sensor or meter, and/or gyroscopic sensor to name a few). The aircraft 110 also includes a number of instruments for displaying information the flight crew 138 and/or to receive input from the flight crew 138, for example an altimeter 140*a*, an airspeed indicator 140*b*, a compass, a vertical speed indicator, engine performance indicators, a gyroscope pitch or bank indicator (artificial horizon), a gyroscopic direction and rate of turn indicator, a fuel volume indicator 140*c*, oil pressure indicator, to name just a few.

The aircraft 110 also includes a number of actuators (e.g., electric motors 142*a*, valves and hydraulic or pneumatic pistons 142*b*, solenoids 142*c*) which are typically mechanically coupled to control the operation and/or position of various flight control surfaces (e.g., ailerons, elevator, rudder, flaps, slats, spoilers, balance tabs, elevator tabs) as well as other components (e.g., throttle, landing gear, internal pressure and temperature).

As alluded to in the background, many of today's aircraft still employ legacy communications systems and communications buses (e.g., ARINC 429; ARINC 834, Aircraft Communications Addressing and Report System (AC-ARS)). Some aircraft may employ satellite Wi-Fi and/or cellular Wi-Fi Air-to-Ground communications. In many instances, communications with the ground may be of limited bandwidth, may be complicated (e.g., requiring various changes in formatting of data to accommodate various otherwise incompatible links in the communications channels), may be unidirectional, and, or may be expensive (e.g., satellite communications). For instance, it may be difficult or expensive to uplink various types of information from their respective ground-based repositories to the aircraft. In some instances, it may be impractical or even impossible to provide certain types of information or data (e.g., instrumented airspeed) from the aircraft to the ground during a flight, where that same information may be accessible once the aircraft is on the ground.

In many aircraft 110, particularly commercial aircraft, the flight crew 138 can employ an electronic flight bag (EFB) 144. The electronic flight bag 144 typically takes the form of a tablet computer (e.g., iPad®), having a processor, memory (RAM, ROM, FLASH) and loaded with applications (processor-executable instructions) which allow the flight crew 138 to perform flight planning. The electronic flight bag 144 can be communicatively coupled to the avionics bus 130, for example via an aircraft interface 146 that interfaces between two legacy communications buses (e.g., ARINC 429 communications bus and ARINC 834 communications bus). The electronic flight bag 144 can include a TAP user interface 148, allowing the provision (e.g., display, annunciation) to the flight crew 138 of information (e.g., flight plans, alternative flight plans) generated by the TAP processor-based system 102 and/or allowing the flight crew 138 to provide (e.g., enter, select) information and/or commands to the TAP processor-based system 102.

The aircraft 110 also includes one or more radios 150*a*, 150*b*, 150*c* (three shown) which allow the flight crew 138 to communicate with ground-based resources and/or optionally with other flight crews of other aircraft.

In particular, a first radio 150*a* provides communications between the flight crew 138 and air traffic control (e.g., en route air traffic control system 112). Such can, for instance, be implemented via ACARS messaging over radio or satellite communications link (e.g., "type-b" message for aircrew communications). Such can, for example, allow the flight crew 138 to submit to and request approval from air traffic control for a flight plan or a change to the flight plan. Such can, for example, allow the air traffic control to receive a submitted flight plan or change to a flight plan and authorize same. In some implementations, the flight plan or a change to the flight plan (alternative flight plan, e.g., revised, modified or adjusted flight plan) can be in the form of processor-executable instructions, for example executable by the FMS to automatically control the aircraft 110 to fly a trajectory specified by the flight plan.

A second radio 150*b* provides communications between a carrier airline's operational control center (e.g., airline operation control processor-based system(s) 120) and the aircraft 110, for instance with the flight crew 138, the avionics bus 130 and, or, the FMS 132 of the aircraft 110. Such can, for example, allow the flight crew 138 to submit to and request approval from the carrier airline's operational control center for a flight plan or an alternative flight plan (e.g., change to the flight plan). Such can, for example, allow the carrier airline's operational control center to receive a submitted flight plan or an alternative flight plan (e.g., change to a flight plan) and approve same, for example after confirming that the proposed flight plan conforms with the carrier airlines cost function. In some implementations, the flight plan or an alternative flight plan (e.g., change to the flight plan (e.g., revised, modified or adjusted flight plan)) can be in the form of processor-executable instructions, for example executable to automatically populate the FMS with the alternative flight plan for the pilot to request authorization or approval from ATC, and optionally to automatically control the aircraft 110 to fly a trajectory specified by the flight plan subsequently to authorization or approval by ATC.

A third radio 150*c* provides communications between the TAP processor-based system 102 and the aircraft 110, for instance with the flight crew 138 via the EFB 144 and TAP UI 148, with the avionics bus 130 and, or, with the FMS 132 of the aircraft 110. Such can, for instance, be implemented via ACARS messaging over radio or satellite communications link (e.g., "type-b" message for aircrew communications). Such can, for example, advantageously allow ground-based computation of a flight plan or an alternative fight plan (e.g., a change to the flight plan (e.g., revised, modified or adjusted flight plans)) using information from various ground-based resources or systems, with uplinking to the aircraft generally limited to a proposed or even approve and/or authorized flight plan (e.g., alternative flight plan (e.g., revised, modified or adjusted flight plans)), advantageously avoiding uplinking all of the information from the ground-based resources or systems to the aircraft that is used in the computation of a revised, modified or adjusted flight plan. Such can also, for example, the flight crew 138 to request that the TAP processor-based system 102, which is typically ground-based, compute or determine a flight plan or an alternative fight plan (e.g., a revised, modified or adjusted flight plan). In some implementations, the flight plan or an alternative fight plan (e.g., a change to the flight plan (e.g., revised, modified or adjusted flight plan)) can be in the form of processor-executable instructions, for example executable by the FMS to automatically control the aircraft 110 to fly a trajectory specified by the flight plan.

As noted above the aircraft 110 carries an aircraft transponder 116, which required equipment for operation in many regions. The aircraft transponder 116 typically includes, or is communicatively coupled with, a global navigation system radio or receiver and antenna. Thus, the aircraft transponder 116 receives signals from satellites 152*a*, 152*b* (two shown) of a constellation of satellites that are in space 154 orbit around the Earth. The global navigation system radio can take any of a variety of forms employing any of a variety of global navigation system networks (e.g., Global Positioning System (GPS) network, GLONASS network, GALILEO network, BEIDOU network, QZSS network, IRNSS network). As also noted above, the aircraft transponder 116 transmits telemetry 114 or squawks, either when interrogated or from time-to-time (e.g., periodically). The telemetry 114 includes global navigation coordinates and geometric altitude of the aircraft at the time of the transmission or squawk, as well as a unique identifier that uniquely identifies the specific individual aircraft 110. The TAP processor-based system 102 optionally advantageously takes advantage of the "free" information, thereby reducing an amount of additional information downlinked from the aircraft 110, as well as advantageously significantly reducing an amount of information uplinked to the aircraft 110, as described herein.

Figure 2A:
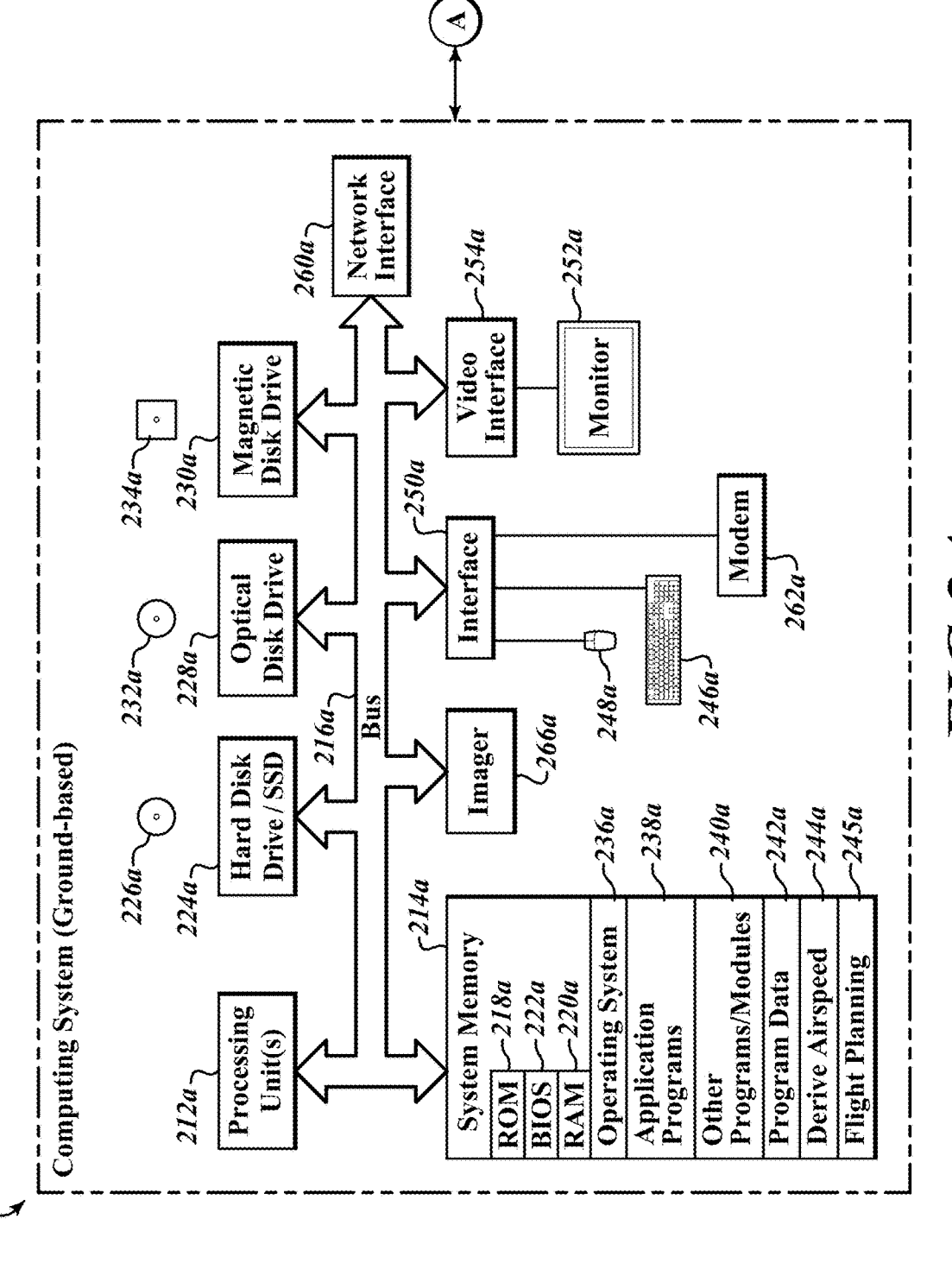
FIG. 2A is a schematic diagram of a traffic aware planner (TAP) computing system, according to at least one illustrated implementation.
Figure 2B:
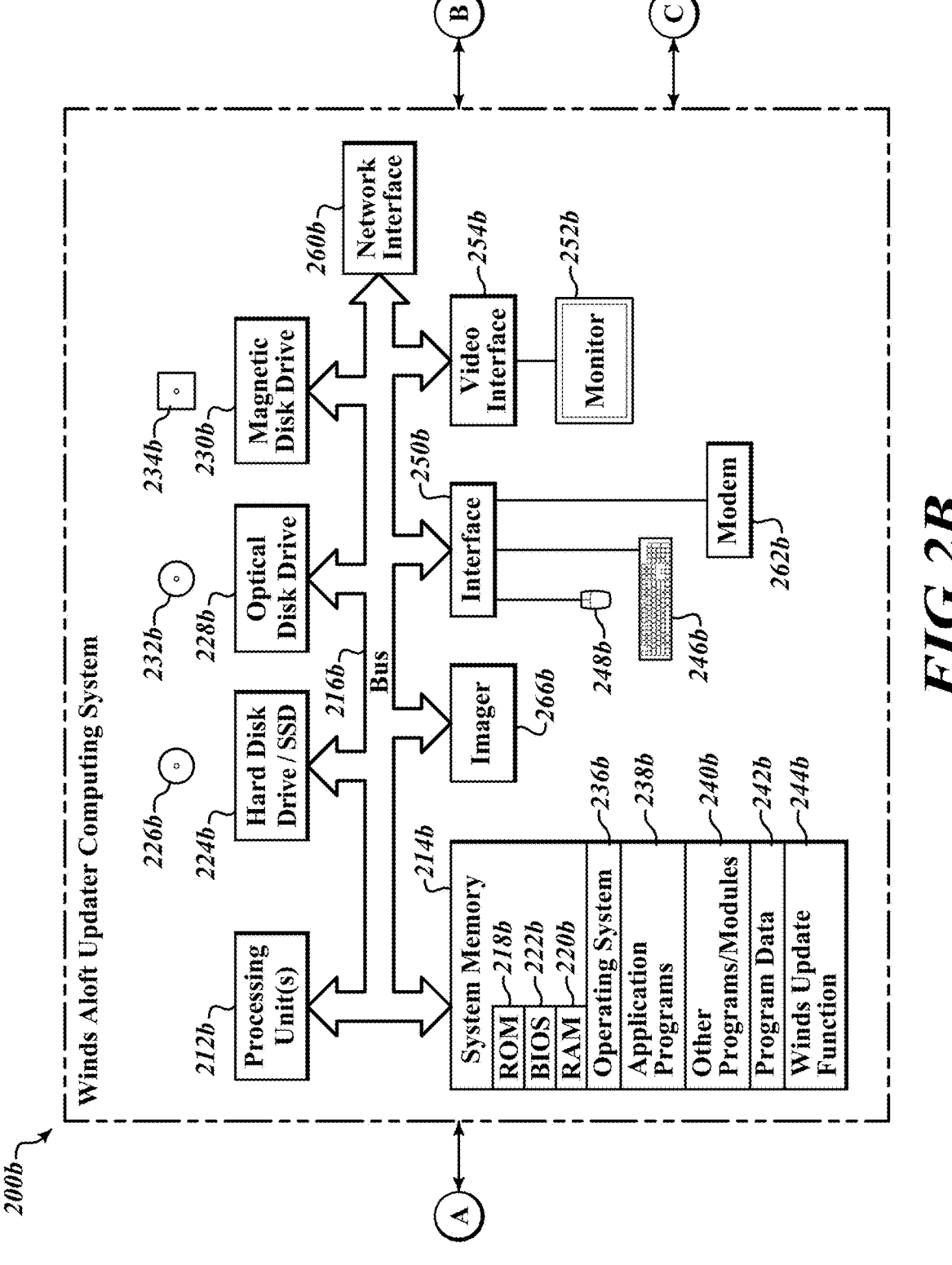
FIG. 2B is a schematic diagram of a winds aloft updater computing system, according to at least one illustrated implementation.
Figure 2C:
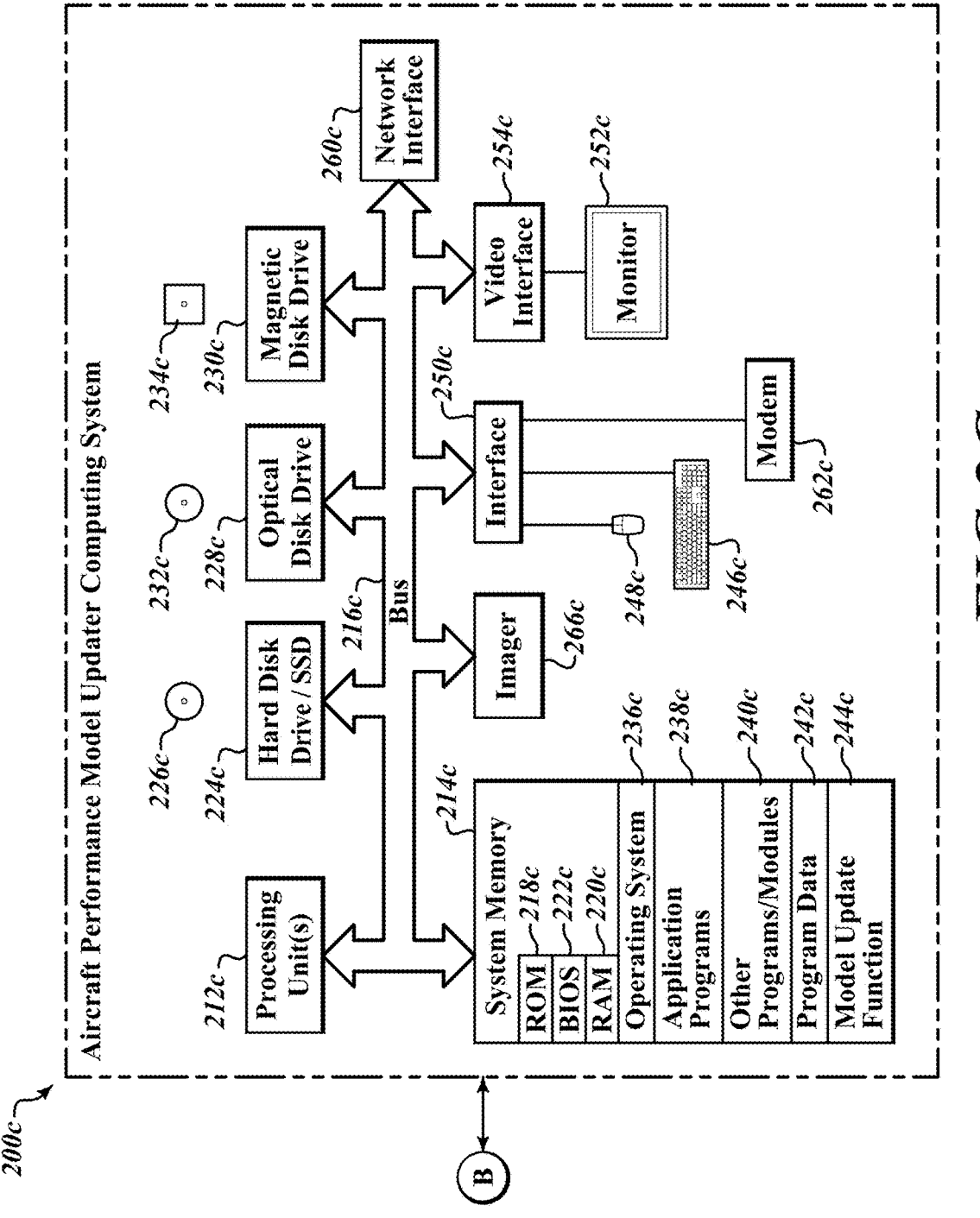
FIG. 2C is a schematic diagram of an aircraft performance model updater computing system, according to at least one illustrated implementation.
Figure 2D:
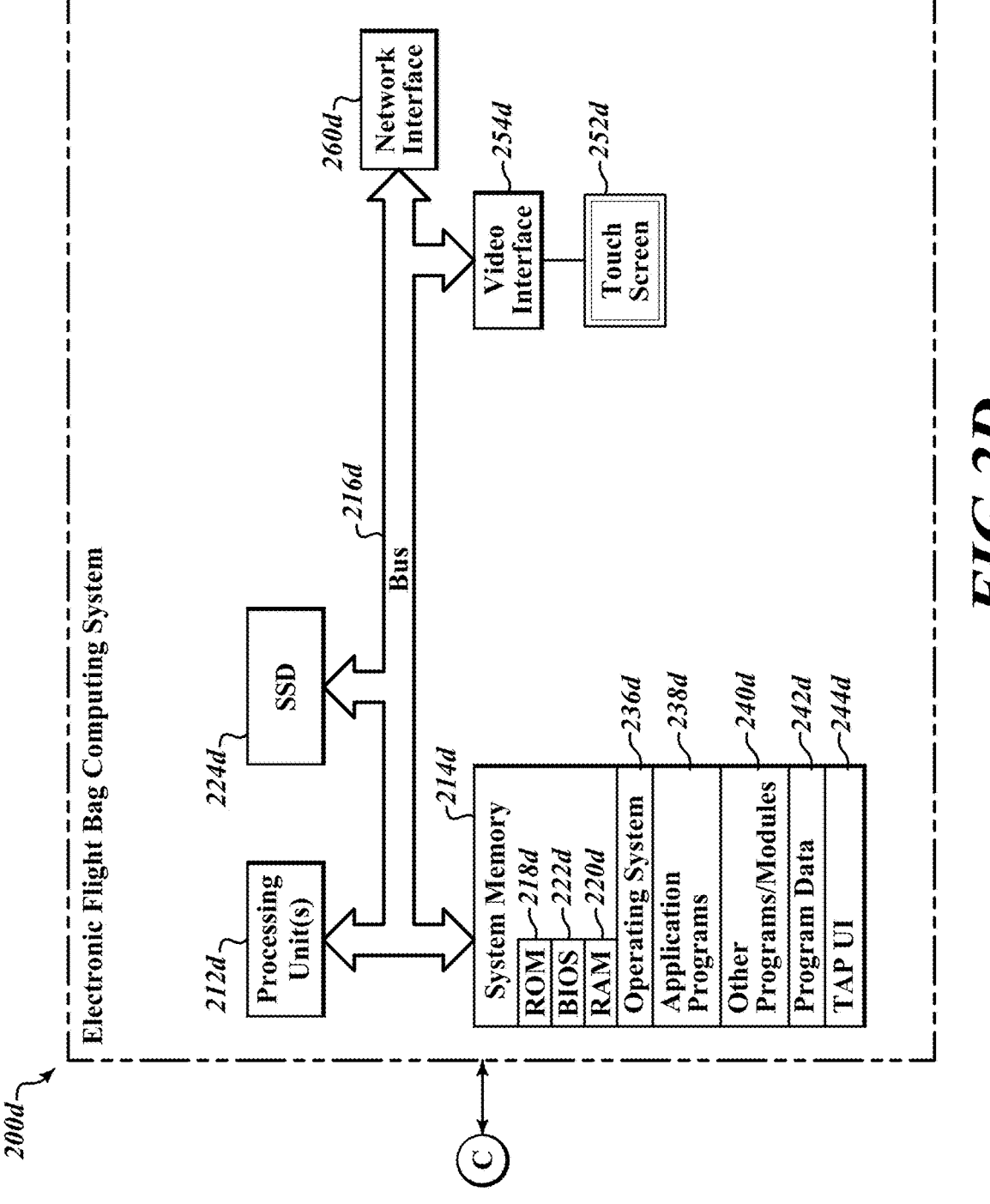
FIG. 2D is a schematic diagram of an electronic flight bag computing system, according to one illustrated embodiment.

FIG. 2A shows a traffic aware planner (TAP) computing system 200*a*. FIG. 2B shows a winds aloft updater computing system 200*b*. FIG. 2C shows an aircraft performance model updater computing system 200*c*. FIG. 2D shows an electronic flight bag computing system 200*d*, according to one illustrated embodiment. The TAP computing system 200*a* can implement the TAP processor-based system 102 (FIG. 1). The winds aloft updater computing system 200*b* can implement the winds aloft updater processor-based systems 124 (FIG. 1). The aircraft performance model updater computing system 200*c* can implement the aircraft performance updater processor-based systems 128 (FIG. 1). The electronic flight bag computing system 200*d* can implement the electronic flight bag (EFB) 144 (FIG. 1).

The TAP computing system 200*a* is suitable for implementing aspects of the traffic aware flight planning including generating alternative fight plans (e.g., revisions, modifications or adjustments to flight plans) as described herein, for example ground-based flight planning based on derived airspeeds which advantageously reduces communications with aircraft. The TAP computing system 200*a* is suitable for implementing flight planning (e.g., generating flight route alternatives to routes of existing flight plans that may themselves be generated from other flight planning systems), for example during a flight, taking into account aircraft traffic, winds aloft data (e.g., forecasted winds aloft, adjusted winds aloft, three-dimensional weather model which includes forecasted winds aloft data), weather (e.g., convective storms), turbulence, restricted airspace, imposed delays by air traffic control, a performance model or characteristics of a specific individual aircraft to generate optimized flight plans, which may be optimized (optimized though not necessarily optimal, e.g., minimize fuel consumption; minimize travel time, minimize missed connections, maximize on time departures, maximize on time arrivals, minimize overall cost of operation for a carrier airline) consistent with criteria employed by a respective carrier airline that operates the subject aircraft. The TAP computing system 200*a* can operate in conjunction with the winds aloft updater computing system 200*b*, the aircraft performance model updater computing system 200*c*, and the electronic flight bag computing system 200*d* to implementing aspects flight planning described herein, for example generating alternative fight plans (e.g., revised, modified or adjusted flight plans) for an aircraft which may be optimized across one or more operational parameters.

The various computing systems will at times be referred to in the singular herein, but this is not intended to limit the embodiments to a single device or system, since in typical embodiments there may be more than one computing system or device performing any given function, for example to distribute workload. Additionally, while the TAP computing system 200*a* and the winds aloft updater computing system 200*b* are illustrated and described as separate computing systems, in some implementations a computing system can be employed that provides the operations of both the TAP computing system 200*a* and the winds aloft updater computing system 200*b*. Additionally, while the TAP computing system 200*a* and the aircraft performance model updater computing system 200*c* are illustrated and described as separate computing systems, in some implementations a computing system can be employed that provides the operations of both the TAP computing system 200*a* and the aircraft performance model updater computing system 200*c*.

Traffic Aware Planner Computing System

With reference to FIG. 2A, the traffic aware planner (TAP) computing system 200*a* may include one or more processing units 212*a*, a system memory 214*a* and a system bus 216*a* that couples various system components including the system memory 214*a* to the processing units 212*a*. The processing unit(s) 212*a* may be any logic processing unit, such as one or more central processing units (CPUs), digital signal processors (DSPs), graphics processing units (GPUs), application-specific integrated circuits (ASICs), field programmable gate arrays (FPGAs), etc. The system bus 216*a* can employ any known bus structures or architectures, including a memory bus with memory controller, a peripheral bus, and a local bus. The system memory 214*a* includes read-only memory ("ROM") 218*a* and random access memory ("RAM") 220*a*. A basic input/output system ("BIOS") 222*a*, which can form part of the ROM 218*a*, contains basic routines that help transfer information between elements within the TAP computing system 200*a*, such as during start-up.

The TAP computing system 200*a*, which can execute a TAP application, may also include a plurality of interfaces such as network interface 260*a*, interface 250*a*, supporting modem 262*a* or any other wireless/wired interfaces.

The TAP computing system 200*a* may include a hard disk drive 224*a* for reading from and writing to a hard disk or SSD 226*a*, an optical disk drive 228*a* for reading from and writing to optical disk 232*a*, and/or a magnetic disk drive 230*a* for reading from and writing to removable magnetic disks 234*a*. The optical disk 232*a* can be a CD-ROM or DVD-ROM, while the removable magnetic disk 234*a* can be any magnetic storage media. The hard disk drive 224*a*, optical disk drive 228*a* and magnetic disk drive 230*a* may communicate with the processing unit 212*a* via the system bus 216*a*. The hard disk drive 224*a*, optical disk drive 228*a* and magnetic disk drive 230*a* may include interfaces or controllers (not shown) coupled between such drives and the system bus 216*a*, as is known by those skilled in the relevant art. The drives 224*a*, 228*a* and 230*a*, and their associated computer-readable storage media 226*a*, 232*a*, 234*a*, may provide nonvolatile and non-transitory storage of computer readable instructions, data structures, program modules and other data for the TAP computing system 200*a*. Although the depicted TAP computing system 200*a* is illustrated employing a hard disk or SSD 226*a*, optical disk 232*a* and removable magnetic disk 234*a*, those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EE-PROM), flash memory, compact disc ROM (CD-ROM), digital versatile disks (DVD) or other optical disk storage, magnetic storage devices, solid state memory or any other medium which can be used to store the desired information and which may be accessed by processing unit(s) 212a.

Program modules can be stored in the system memory 214a, such as an operating system 236a; one or more application programs 238a; other programs or modules 240a; program data 242a; airspeed derivation application 244a (i.e., estimated airspeed derived from global navigation information, and optionally pressure altitude, winds aloft, three-dimensional weather model which includes forecasted winds aloft data, etc.) and flight plan generation application 245a. Application programs 238a along with the program data 242a, airspeed derivation application 244a and flight plan generation application 245a, may include processor-executable instructions and data that cause the processor(s) 212a to execute the various algorithms described herein. The airspeed derivation application 244a can derive (e.g., calculate or otherwise determine or estimate) an at least approximate airspeed of an aircraft based on transponder telemetry (e.g., global navigation or geographic coordinates, and optionally geographic altitude) and based on winds aloft information (e.g., forecasted winds aloft information; adjusted winds aloft information, three-dimensional weather model which includes forecasted winds aloft data) for a given altitude or set of altitudes, and optionally based in air pressure at the given altitude or range of altitudes, temperature at the given altitude or range of altitudes and/or speed of sound at the given altitude or range of altitudes. The flight plan generation application 245a can generate alternative fight plans (e.g., changed, revised, modified or adjusted flight plans) for an aircraft based on the derived airspeed and based on other information (e.g., aircraft traffic, winds aloft data (e.g., forecasted winds aloft, adjusted winds aloft), weather (e.g., three-dimensional weather model which includes forecasted winds aloft data, convective storms), turbulence, restricted airspace, a performance model or characteristics of a specific individual aircraft), where the alternative fight plans (e.g., changed, revised, modified or adjusted flight plan) may be optimized across one or more operational parameters. Other program modules 240a may include instructions for handling security such as password or other access protection and communications encryption. The system memory 214a may also include communications programs, for example, a Web client or browser as part of the application programs 238a for permitting the TAP computing system 200a to access and exchange data with sources such as Web sites of the Internet, corporate intranets, extranets, or other networks and devices as described herein, as well as other server applications on server computing systems.

While shown in FIG. 2A as being stored in the system memory 214a, the operating system 236a, application programs 238a, other programs/modules 240a, program data 242a, airspeed derivation application 244a and flight plan generation application 245a can be stored on the hard disk or SSD 226a of the hard disk drive 224a, the optical disk 232a of the optical disk drive 228a and/or the removable magnetic disk 234a of the magnetic disk drive 230a, or other memory storage devices, such as solid state drives. In at least some implementations, the TAP computing system 200a itself can perform the winds aloft adjustment and/the or aircraft performance model adjustment, rather than using separate dedicated computing systems to perform such.

An operator, such as a user, can enter commands and information into the TAP computing system 200a through input devices such as a touch screen or keyboard 246a, an imager 266a, a pointing device such as a mouse 248a, and/or via a graphical user interface. Other input devices can include a touchpad, microphone, joystick, game pad, tablet, scanner, etc. These and other input devices are connected to one or more of the processing units 212a through an interface 250a such as a serial port interface that couples to the system bus 216a, although other interfaces such as a parallel port, a game port or a wireless interface or a universal serial bus ("USB") can be used. A monitor 252a or other display device is coupled to the system bus 216a via a video interface 254a, such as a video adapter. The TAP computing system 200a can include other output devices, such as speakers, printers, etc.

The TAP computing system 200a can operate in a networked environment using logical connections to one or more remote computers and/or devices, for example: ground-based aircraft tracking processor-based system(s) 108 (e.g., ADS-B) Exchange), other ground-based information systems 105a-105d (FIG. 1), winds aloft updater computing system 200b (FIG. 2B), aircraft performance model updater computing system 200c (FIG. 2C), and electronic flight bag computing system 200d (FIG. 2D). For example, the TAP computing system 200a can operate in a networked environment using logical connections to one or more mobile devices, landline telephones and other service providers or information servers associated with the hash cracking operations as described above with reference to FIG. 2A. Communications may be via a wired and/or wireless network architecture, for instance wired and wireless enterprise-wide computer networks, intranets, extranets, telecommunications networks, cellular networks, paging networks, and other mobile networks.

Winds Aloft Updater Computing System

With reference to FIG. 2B, the winds aloft updater computing system 200b may include one or more processing unit(s) 212b, a system memory 214b and a system bus 216b that couples various system components including the system memory 214b to the processing units 212b. The processing units 212b may be any logic processing unit, such as one or more central processing units (CPUs), digital signal processors (DSPs), graphics processing units (GPUs), application-specific integrated circuits (ASICs), field programmable gate arrays (FPGAs), etc. The system bus 216b can employ any known bus structures or architectures, including a memory bus with memory controller, a peripheral bus, and a local bus. The system memory 214b includes read-only memory ("ROM") 218b and random access memory ("RAM") 220b. A basic input/output system ("BIOS") 222b, which can form part of the ROM 218b, contains basic routines that help transfer information between elements within the winds aloft updater computing system 200b, such as during start-up.

The winds aloft updater computing system 200b may also include a plurality of interfaces such as network interface 260b, interface 250b, supporting modem 262b or any other wireless/wired interfaces.

The winds aloft updater computing system 200b may include a hard disk drive 224b for reading from and writing to a hard disk or SSD 226b, an optical disk drive 228b for reading from and writing to optical disk 232b, and/or a magnetic disk drive 230b for reading from and writing to a removable magnetic disk 234b. The optical disk 232b can be a CD-ROM or DVD-ROM, while the removable magnetic disk 234b can be any magnetic storage media. The hard disk drive 224b, optical disk drive 228b and magnetic disk drive 230b may communicate with the processing unit 212b via the system bus 216b. The hard disk drive 224b, optical disk drive 228b and magnetic disk drive 230b may include interfaces or controllers (not shown) coupled between such drives and the system bus 216*b*, as is known by those skilled in the relevant art. The drives 224*b*, 228*b* and 230*b*, and their associated computer-readable storage media 226*b*, 232*b*, 234*b*, may provide nonvolatile and non-transitory storage of computer readable instructions, data structures, program modules and other data for the winds aloft updater computing system 200*b*. Although the depicted winds aloft updater computing system 200*b* is illustrated employing a hard disk or SSD 226*b*, optical disk 232*b* and removable magnetic disk 234*b*, those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit(s) 212*b*.

Program modules can be stored in the system memory 214*b*, such as an operating system 236*b*; one or more application programs 238*b* (e.g., Web server applications, database applications); other programs or modules 240*b*; program data 242*b*; and optionally hashing functions 244*b*. Application programs 238*b* along with the program data 242*b*, and winds aloft analysis and adjustment application 244*c*, may include processor-executable instructions and data that cause the processor(s) 212*b* to execute the various algorithms described herein. The application programs 238*b* can, for example, implement one or more servers (e.g., Web servers) operable to receive inquiries or requests from the TAP computing system 102 (FIG. 1), 200*a* (FIG. 2A), retrieve winds aloft information (e.g., forecasted winds aloft information from server computing systems operated by National Oceanic and Atmospheric Administration (NOAA), three-dimensional weather model which includes forecasted winds aloft data, barometric pressure, atmospheric temperature for various geographic locations at various altitudes), analysis the winds aloft information relative to information that represents flight characteristic (e.g., derived airspeed or actual airspeed) as being experienced by a plurality of aircraft in a geographic vicinity of one another, in a vicinity an altitude of one another, and in a temporal vicinity of one another, and generated adjusted winds aloft data based an existence and magnitude and direction of any identified discrepancies. While illustrated and described as a sever (e.g., Web server), the application programs 238*b* can take other forms that allow inquiries to be made, winds aloft assessed, and adjusted winds aloft generated. Other program modules 240*b* may include instructions for handling security such as password or other access protection and communications encryption. The system memory 214*b* may also include communications programs, for example, a Web client or browser as part of the application programs 238*b* for permitting the winds aloft updater computing system 200*b* to access and exchange data with sources such as Web sites of the Internet, corporate intranets, extranets, or other networks and devices as described herein, as well as other server applications on other server computing systems.

While shown in FIG. 2B as being stored in the system memory 214*b*, the operating system 236*b*, application programs 238*b*, other programs/modules 240*b*, program data 242*b*, and winds aloft analysis and adjustment application

244*c* can be stored on the hard disk or SSD 226*b* of the hard disk drive 224*b*, the optical disk 232*b* of the optical disk drive 228*b* and/or the removable magnetic disk 234*b* of the magnetic disk drive 230*b*, or other memory storage devices, such as solid state drives.

The winds aloft updater computing system 200*b* can, at least in some implementations, operate without user interaction, Alternatively, an operator, such as a user, can optionally enter commands and information into the winds aloft updater computing system 200*b* through input devices such as a touch screen or keyboard 246*b*, an imager 266*b*, a pointing device such as a mouse 248*b*, and/or via a graphical user interface. Other input devices can include a touchpad, microphone, joystick, game pad, tablet, scanner, etc. These and other input devices are connected to one or more of the processing units 212*b* through an interface 250*b* such as a serial port interface that couples to the system bus 216*b*, although other interfaces such as a parallel port, a game port or a wireless interface or a universal serial bus ("USB") can be used. A monitor 252*b* or other display device is coupled to the system bus 216*b* via a video interface 254*b*, such as a video adapter. The winds aloft updater computing system 200*b* can include other output devices, such as speakers, printers, etc.

The winds aloft updater computing system 200*b* can operate in a networked environment using logical connections to one or more remote computers and/or devices associated with hash cracking operations. For example, the winds aloft updater computing system 200*b* can operate in a networked environment using logical connections to one or more mobile devices, landline telephones and other service providers or information servers as described herein. Communications may be via a wired and/or wireless network architecture, for instance wired and wireless enterprise-wide computer networks, intranets, extranets, telecommunications networks, cellular networks, paging networks, and other mobile networks.

Aircraft Performance Model Updater Computing System

With reference to FIG. 2C, the aircraft performance model updater computing system 200*c* may each include one or more processing units 212*c*, a system memory 214*c* and a system bus 216*c* that couples various system components including the system memory 214*c* to the processing units 212*c*. The processing unit(s) 212*c* may be any logic processing unit, such as one or more central processing units (CPUs), digital signal processors (DSPs), graphics processing units (GPUs), application-specific integrated circuits (ASICs), field programmable gate arrays (FPGAs), etc. The system bus 216*c* can employ any known bus structures or architectures, including a memory bus with memory controller, a peripheral bus, and a local bus. The system memory 214*c* includes read-only memory ("ROM") 218*c* and random access memory ("RAM") 220*c*. A basic input/output system ("BIOS") 222*c*, which can form part of the ROM 218*c*, contains basic routines that help transfer information between elements within the aircraft performance model updater computing system 200*c*, such as during start-up.

The aircraft performance model updater computing system 200*c* may also each include a plurality of interfaces such as network interface 260*c*, interface 250*c*, supporting modem 262*c* or any other wireless/wired interfaces, including radios.

The aircraft performance model updater computing system 200*c* may include a hard disk drive 224*c* for reading from and writing to a hard disk or SSD 226*c*, an optical disk drive 228*c* for reading from and writing to optical disk 232*c*, and/or a magnetic disk drive 230*c* for reading from and writing to a removable magnetic disk 234c. The optical disk 232c can be a CD-ROM or DVD-ROM, while the removable magnetic disk 234c can be any removable magnetic storage media. The hard disk drive 224c, optical disk drive 228c and magnetic disk drive 230c may communicate with the processing unit(s) 212c via the system bus 216c. The hard disk drive 224c, optical disk drive 228c and magnetic disk drive 230c may include interfaces or controllers (not shown) coupled between such drives and the system bus 216c, as is known by those skilled in the relevant art. The drives 224c, 228c, and 230c, and their associated computer-readable storage media 226c, 232c, 234c, may provide nonvolatile and non-transitory storage of computer readable instructions, data structures, program modules and other data for the aircraft performance model updater computing system 200c. Although the depicted aircraft performance model updater computing system 200c are illustrated employing a hard disk or SSD 226c, optical disk 232c and removable magnetic disk 234c, those skilled in the relevant art will appreciate that other types of computer-readable storage media that can store data accessible by a computer may be employed, such as flash memory, digital video disks ("DVD"), Bernoulli cartridges, RAMs, ROMs, smart cards, various solid state drives, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit(s) 212c.

Program modules can be stored in the system memory 214c, such as an operating system 236c; one or more application programs 238c; other programs or modules 240c; program data 242c; and aircraft performance model analysis and adjustment application 244c. Application programs 238c along with the program data 242c, and aircraft performance model analysis and adjustment application 244c, may include processor-executable instructions and data that cause the processor(s) 212c to execute the various algorithms described herein. The application programs 238c and aircraft performance model analysis and adjustment application 244c can, for example, cause analysis of predicted or estimate aircraft performance relative to actual aircraft performance (e.g., to identify and quantify any discrepancies), and generation of an adjusted aircraft performance model for a specific individual aircraft based on the analysis. Other program modules 240c may include instructions for handling security such as password or other access protection and communications encryption. The system memory 214c may also include communications programs, for example, a Web client or browser as part of the application programs 238c for permitting the aircraft performance model updater computing system 200c to access and exchange data with sources such as Web sites of the Internet, corporate intranets, extranets, or other networks and devices as described herein, as well as server applications on other server computing systems.

While shown in FIG. 2C as being stored in the system memory 214c, the operating system 236c, application programs 238c, other programs/modules 240c, program data 242c, and aircraft performance model analysis and adjustment application 244c can be stored on the hard disk or SSD 226c of the hard disk drive 224c, the optical disk 232c of the optical disk drive 228c and/or the removable magnetic disk 234c of the magnetic disk drive 230c, or other memory storage devices, such as solid state drives or FLASH drives.

An operator, such as a user, optionally can enter commands and information into the aircraft performance model updater computing system 200c through input devices such as a touch screen or keyboard 246c, an imager 266c, a pointing device such as a mouse 248c, and/or via a graphical user interface. Other input devices can include a touchpad, microphone, joystick, game pad, tablet, scanner, etc. These and other input devices are connected to one or more of the processing unit(s) 212c through an interface 250c such as a serial port interface that couples to the system bus 216c, although other interfaces such as a parallel port, a game port or a wireless interface or a universal serial bus ("USB") can be used. A monitor 252c or other display device is coupled to the system bus 216c via a video interface 254c, such as a video adapter. The aircraft performance model updater computing system 200c can include other output devices, such as speakers, printers, etc.

The aircraft performance model updater computing system 200c can operate in a networked environment using logical connections to one or more remote computers, for example in communications with the TAP computing system 200a (FIG. 2A), a data store of aircraft performance models or performance data 129 (FIG. 1) and/or one or more carrier airline computer systems (e.g., airline operation control processor-based systems 120, FIG. 1). For example, the aircraft performance model updater computing system 200c can operate in a networked environment using logical connections to one or more mobile devices, landline telephones and other service providers or information servers associated as described herein. Communications may be via a wired and/or wireless network architecture, for instance wired and wireless enterprise-wide computer networks, intranets, extranets, telecommunications networks, cellular networks, paging networks, and other mobile networks.

Electronic Flight Bag Computing System

With reference to FIG. 2D, the electronic flight bag computing system 200d may include one or more processing units 212d, a system memory 214d and a system bus 216d that couples various system components including the system memory 214d to the processing unit(s) 212d. The processing unit(s) 212d may be any logic processing unit, such as one or more central processing units (CPUs), digital signal processors (DSPs), graphics processing units (GPUs), system-on-chips (SOCs), application-specific integrated circuits (ASICs), field programmable gate arrays (FPGAs), etc. The system bus 216d can employ any known bus structures or architectures, including a memory bus with memory controller, a peripheral bus, and a local bus. The system memory 214d includes read-only memory ("ROM") 218d and random access memory ("RAM") 220d. A basic input/output system ("BIOS") 222d, which can form part of the ROM 218d, contains basic routines or processor-executable instructions that help transfer information between elements within the client computing systems 200d, such as during start-up. The electronic flight bag computing system 200d will typically take the form of a tablet computer system with appropriate applications loaded in memory.

The electronic flight bag computing system 200d may also include a plurality of interfaces such as network interface 260d and, or, any other wireless/wired interfaces.

The electronic flight bag computing system 200d may include a solid state drive (SSD) or FLASH memory 224d. The SSD or FLASH memory 224d may communicate with the processing unit 212c, 212d via the system bus 216c, 216d. The SSD or FLASH memory 224d may include interfaces or controllers (not shown) to couple such with the system bus 216d, as is known by those skilled in the relevant art. The SSD or FLASH memory 224d, may provide non-volatile and non-transitory storage of computer readable instructions, data structures, program modules and other data for the electronic flight bag computing system 200d. Although the depicted electronic flight bag computing system 200d is illustrated employing a SSD or FLASH memory 224d, those skilled in the relevant art will appreciate that other types of computer-readable storage media that can store data accessible by a computer may be employed. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic storage devices, solid state memory or any other medium which can be used to store the desired information and which may be accessed by processing unit(s) 212d.

Program modules can be stored in the system memory 214d, such as an operating system 236d; one or more application programs 238d; other programs or modules 240d; program data 242d; and a TAP user interface (UI) application 244d (e.g., processor-executable instructions to present TAP generated information and to receive flight crew inputs). Application programs 238d along with the program data 242d, and TAP user interface application 244d, may include processor-executable instructions and data that cause the processor(s) 212d to execute various algorithms described herein and, or to interact with the TAP computing system 102 (FIG. 1), 200a (FIG. 2A), for instance by rendering a graphical user interface with user selectable icons (e.g., menus, radio buttons, pull-down menus, alpha-numeric or keyed entry fields, scroll bars, icons). The application programs 238d and the TAP user interface application 244d cause presentation of flight planning information (e.g., flight plans, alternative flight plans) generated by the TAP computing system 102 (FIG. 1), 200a (FIG. 2A) and/or to receive input (e.g., selections, data, keyed input) from the flight crew to be provided to the TAP computing system 102 (FIG. 1), 200a (FIG. 2A). Other program modules 240d may include instructions for handling security such as password or other access protection and communications encryption in addition to other flight management applications typically found on an electronic flight bag computing system. The system memory 214d may also include communications programs, for example, a Web client or browser as part of the application programs 238d for permitting the electronic flight bag computing system 200d to access and exchange data with sources such as Web sites of the Internet, corporate intranets, extranets, or other networks and devices as described herein, as well as server applications on other server computing systems, and the FMS 132 and other components via the avionics bus 130 (FIG. 1).

While shown in FIG. 2D as being stored in the system memory 214d, the operating system 236d, application programs 238d, other programs/modules 240d, program data 242d, and TAP interface application 244d can be stored on other nontransitory processor-readable media (e.g., memory, computer storage).

The flight crew 138 (FIG. 1) can enter commands and information into the electronic flight bag computing system 200d through input devices such as a touch screen display 246d. Other input devices can be employed. These and other input devices are typically connected to the processing unit(s) 212d through an interface, for example a video interface 254d. The electronic flight bag computing system 200d can include other output devices, such as speakers, haptic engine, etc.

The electronic flight bag computing system 200d can operate in a networked environment using logical connections to one or more remote computers and/or devices associated with hash cracking operations. For example, the electronic flight bag computing system 200d can operate in a networked environment using logical connections to one or more radios, and, or wired or optical buses. Communications may be via a wired and/or wireless network architecture, for instance wired and wireless enterprise-wide computer networks, wide area networks and, or local area networks. Typically, communications with ground-based systems is bandwidth limited.

Figure 3:
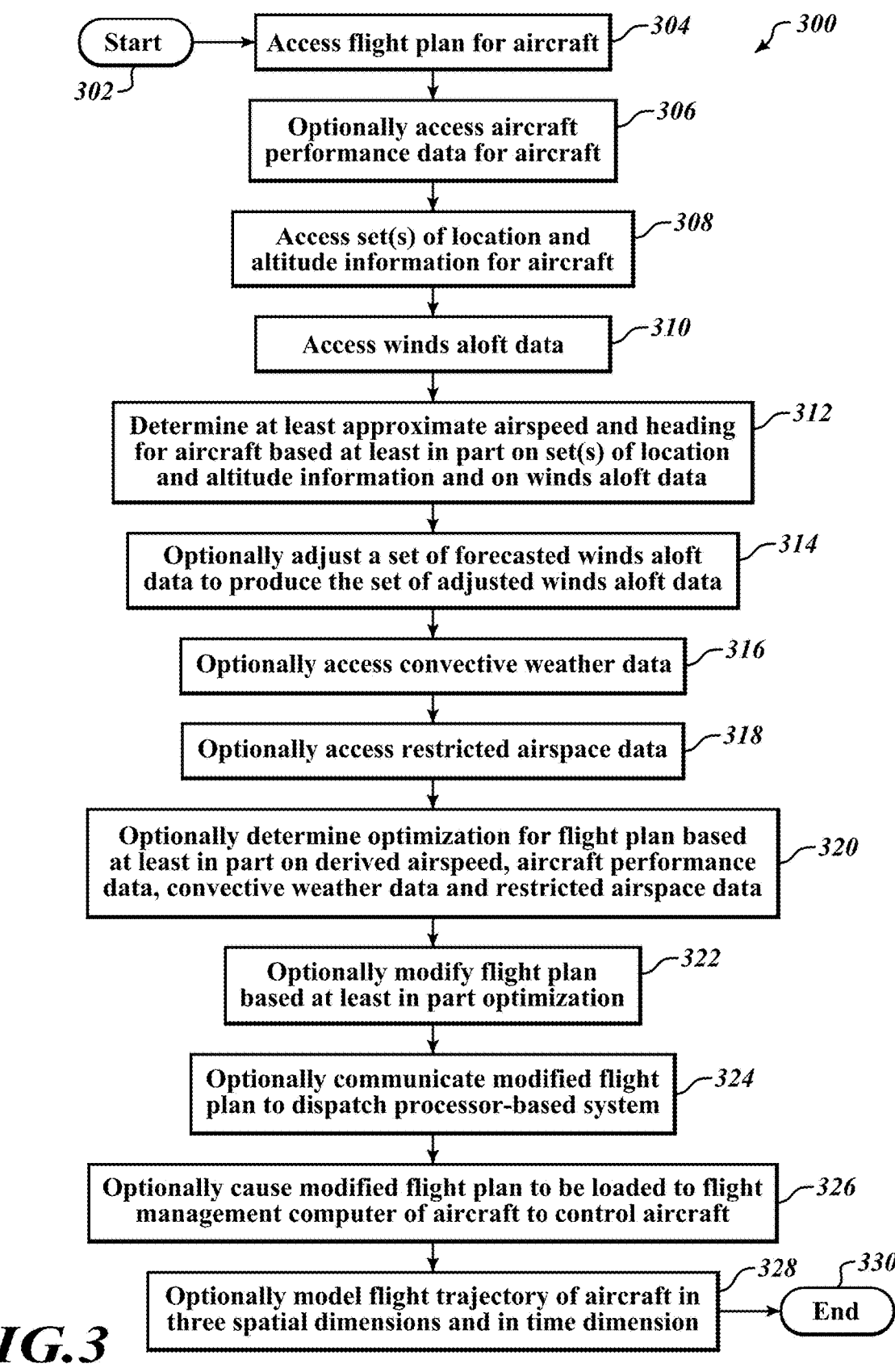
FIG. 3 is a flow diagram showing a method of operation of a processor-based system to generate alternative (e.g., adjusted flight plans) based at least in part on a calculated or derived airspeed of an aircraft, according to at least one illustrated implementation.

FIG. 3 shows a method 300 of operation of a processor-based system to generate alternative fight plans (e.g., changed, revised or modified or adjusted flight plans) or to otherwise change, revise or modify or adjust flight plans based at least in part on a calculated or derived at least approximate airspeed of an aircraft, according to at least one illustrated implementation. The processor-based system can advantageously comprise a ground-based processor-based system, for instance a ground-based computer system or ground based computer sever system. In some implementations, the processor-based system can, for example, comprise an on-board processor-based system (e.g., tablet computer, iPad® tablet computer) located on-board the particular aircraft, which may be communicatively coupled to the aircraft instrumentation or may be communicatively isolated from the aircraft instrumentation (e.g., isolated the pitot static tube airspeed measurements). Thus, the processor-based system can be one of: i) a ground-based processor-based system, ii) an aircraft-based processor-based system that is not communicatively coupled to a bus that carries instrumented data, or alternatively ii) an aircraft-based processor-based system that is communicatively coupled to a bus that carries instrumented data. As described herein, the processor-based system repeatedly determines an at least approximate airspeed for a particular aircraft during a flight of the particular aircraft.

The method 300 starts at 302, for example in response to a powering ON of the processor-based system or component thereof, on receipt of a call or other invocation, for instance by a calling or invoking routine, or on receipt of a request or a command, or on receipt of data.

At 304, the processor-based system or a component thereof, accesses a flight plan for a particular aircraft. For example, the processor-based system or a component thereof can retrieve a flight plan for the particular aircraft from a ground-based flight plan processor-based system that stores and provides (serves) flight plans (e.g., previously filed flight plans for the particular aircraft and/or other aircraft). For instance, the processor-based system or a component thereof can retrieve a flight plan from the FAA or from various ADS-B tracking sites (e.g., Flight Aware®). Thus, a ground-based flight planning or optimization system can access flight plans stored on a ground-based flight plan filing processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited.

Optionally at 306, the processor-based system or a component thereof, accesses aircraft performance data for the particular aircraft. For example, the processor-based system or a component thereof can access aircraft performance data or even an aircraft performance model, from a data store that stores such information. For example, the processor-based system or component thereof can store such information locally or query a separate aircraft performance data storage system for such information. Preferably, the aircraft performance data or the aircraft performance model is specific to a specific individual aircraft (e.g., a specific "tail number"). Such can represent aircraft performance taking into account not only the make and model of aircraft, but also taking into account a current structural configuration (e.g., engine configuration, tail design, wing design, presence or absence of winglets) of the specific individual aircraft and even an age or total number of cycles (e.g., takeoffs and landings, pressurizations) to which the specific individual aircraft has been subjected. Thus, a ground-based flight planning or optimization system can access aircraft specific performance data or aircraft models stored on a ground-based aircraft performance data storage processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited.

Optionally at 308, the processor-based system or a component thereof, accesses one or more sets of location and altitude information (e.g., geographic location and geographic altitude information) for the particular aircraft. The one or more sets of location and altitude information each specifies a respective location and an altitude for the particular aircraft at a respective time, and may preferably be time-stamped. For example, the processor-based system or a component thereof can retrieve one or more sets of transponder telemetry for the particular aircraft from a ground-based aircraft tracking processor-based system. The sets of transponder telemetry can be collected and/or stored by the ground-based aircraft tracking processor-based system from transponder telemetry sent from transponders carried by the aircraft as is current practice in at least most regions in the world. The one or more sets of transponder telemetry can include, for each respective one of a plurality of instances of time, a respective time-stamped set of global navigation system positioning coordinates (e.g., GPS coordinates, GLONASS coordinates, GALILEO coordinates, BEIDOU coordinates, QZSS coordinates, IRNSS coordinates), a respective altitude value (e.g., respective geographic altitude value), and a unique aircraft identifier (e.g., tail number) supplied by a transponder (e.g., global navigation network transponder) on the particular aircraft. The aircraft (e.g., transponder or receiver) receives global navigation signals from various satellites of a global navigation system network (e.g., GPS network, GLONASS network, GALILEO network, BEIDOU network, QZSS network, IRNSS network). Global navigation system positioning coordinates can be determined via a global navigation system radio or receiver on-board the particular aircraft, which may form part of, or otherwise be communicatively coupled with the transponder. The transmission of the information is typically referred to as squawking or a squawk. Thus, a ground-based flight planning or optimization system can access transponder telemetry stored on a ground-based aircraft tracking processor-based system (e.g., server computer system; Automatic Dependent Surveillance-Broadcast (ADS-B) ground service can be employed for aircraft with suitable equipment) that is separate and distinct from the ground-based flight planning or optimization system, via conventional communications channels (e.g., wired, wireless, packetized, Internet) which unlike communications with aircraft are not particularly bandwidth limited.

At 310, the processor-based system or a component thereof, accesses forecasted winds aloft data and optionally air temperature data and/or barometric pressure, for example stored by a ground-based weather information processor-based system (e.g., Aviation Digital Data Service (ADDS) operated by the Aviation Weather Center (AWC) by the National Oceanic and Atmospheric Administration (NOAA); or via a private company, e.g., Weather Services International (WSI), FlightWX by BCI, Inc.). The forecasted winds aloft data, or three-dimensional weather model which includes forecasted winds aloft data, represents forecasted and/or measured winds (e.g., speed, direction) at various altitudes for various geographic regions or area and for various times. The air or atmospheric temperature data represents forecasted and/or measured air or atmospheric temperatures at various altitudes for various geographic regions or area and for various times. The barometric pressure represents forecasted and/or measured barometric pressures at various altitudes for various geographic regions or area and for various times. The forecasted winds aloft data, air temperature and/or barometric pressure at various altitudes can advantageously be used in flight planning, and as described herein can also advantageously be used to derive an at least approximation of airspeed of an aircraft for a given portion of a flight plan or trajectory, based on geographic location and altitude. The forecasted air temperatures and/or barometric pressure at a given geographic location and a given altitude can be employed in determining airspeed in term of a Mach number. Thus, a ground-based flight planning or optimization system can access weather information (e.g., winds aloft, air temperature, barometric pressure) stored on a ground-based weather information processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited.

At 312, the processor-based system or a component thereof, determines an at least approximate airspeed and a heading for the particular aircraft by the processor-based system based at least in part on the one or more sets of location and altitude information (e.g., geographic location and geographic altitude information from transponder telemetry) for the particular aircraft and based at least in part on the winds aloft data (e.g., forecasted winds aloft, adjusted winds aloft, or three-dimensional weather model which includes forecasted winds aloft data) for the at least approximate geographic location and the at least approximate altitude of the aircraft, and optionally based at least in part on air temperature and/or barometric pressure for the at least approximate geographic location and the at least approximate altitude of the aircraft. The processor-based system or a component thereof can, for example, employ global navigation coordinates (e.g., GPS coordinates) which may represent ground locations, and time-stamps to determine an at least approximate ground speed of the aircraft (e.g., geographic distance traveled as represented by GPS coordinates over time). The processor-based system or a component thereof can, for example, employ forecasted winds aloft data or even adjusted winds aloft data to determine an airspeed and a heading of the aircraft at various instance of times or at various locations or points along a flight path of the aircraft for one or more altitudes. Such can, for instance, be performed using vector addition. Such can even take into account performance characteristics of a specific individual aircraft to improve the approximation of the derived airspeed and Mach number.

Optionally at 314, the processor-based system or a component thereof, adjusts a set of winds aloft data (e.g., forecasted winds aloft data or three-dimensional weather model which includes forecasted winds aloft data) to produce the set of adjusted winds aloft data. Such is described in more detail elsewhere herein, for example with respect to the discussion of a method 900 (FIG. 9) below.

Optionally at 316, the processor-based system or a component thereof, accesses convective weather data and/or turbulence data. For example, the processor-based system or a component thereof can access convective weather data and/or turbulence data from a ground-based weather system or service. For example, the processor-based system or a component thereof can access convective weather data and/or turbulence data from the Traffic Flow Management (FM) Convective Forecast (TCF) made available by the AWC of NOAA, or private company e.g., WSI or FlightWX. Convective weather data typically indicates areas or regions and altitudes of convective storms. Aircraft typically route around significant convective weather events out of a concern for safety of the aircraft and its passengers. Thus, a ground-based flight planning or optimization system can access convective weather information and/or turbulence data stored on a ground-based convective weather information processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited.

Optionally at 318, the processor-based system or a component thereof, accesses restricted airspace data. The processor-based system or a component thereof can access Special Use Airspace (SUA) information provided by the FAA. There are various reasons for closing an airspace to civilian traffic, for example where the airspace is over a military installation. Aircraft typically route around closed or restricted airspace as such is required by the governing (FAA) regulations. Thus, a ground-based flight planning or optimization system can access restricted airspace data stored on a ground-based restricted airspace information processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited.

Optionally at 320, the processor-based system or a component thereof, determines an optimization for an alternative flight plan based at least in part on the determined or derived airspeed, aircraft performance data for the particular aircraft, the convective weather data, turbulence data and/or the restricted airspace data. Such can employ various techniques or elements of the TASAR system, although modified to employ both derived airspeed and the aircraft performance data or even an aircraft performance model for a specific individual aircraft. Various techniques from U.S. application Ser. No. 17/338,051, published as U.S. 2021/0383708; U.S. application Ser. No. 17/338,203, published as U.S. 2021/0383706; International (PCT) Application Serial No. PCT/US2021/035866, published as WO 2021/247980; International (PCT) Application Serial No. PCT/US2021/035882, published as WO 2021/247985; U.S. Pat. No. 8,977,482; and, or U.S. Pat. No. 10,102,756, can optionally be employed.

Optionally at 322, the processor-based system or a component thereof, generates an alternative flight plan (e.g., changes, revises or modifies the flight plan) based at least in part on the optimization, thereby accounting for: the determined or derived airspeed, derived pressure altitude, and aircraft performance data for the particular or specific individual aircraft, the convective weather data, turbulence data and/or the restricted airspace data.

Optionally at 324, the processor-based system or a component thereof, communicates the alternative fight plan (e.g., changed, revised or modified or adjusted flight plan) to an airline operational control ("dispatch") processor-based system for consideration, approval and/or action. Thus, a ground-based flight planning or optimization system submit the alternative fight plan (e.g., changed, revised or modified or adjusted flight plan) to a ground-based dispatch processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited. Before implementing an alternative fight plan (e.g., changed, revised or modified or adjusted flight plan), such also needs to be submitted and approved by the En Route Air traffic control (ATC), for example via the System Wide Information Management (SWIM) system operated by the FAA as part of the National Airspace System (NAS).

Optionally at 326, the processor-based system or a component thereof, or some other processor-based system, causes the alternative fight plan (e.g., changed, revised or modified or adjusted flight plan) to be loaded to flight management computer of the particular aircraft to control the particular aircraft. Such typically involves communications (i.e., up-linked) with the particular aircraft. Notably, to this point communications with the aircraft has been limited, generally relying on transponder telemetry which is being communicated (i.e., downlinked) independent of flight planning by rule or regulation to fly in many regions or areas (i.e., rules or regulations require aircraft to be equipped with function transponder for air traffic control when operating in most airspaces).

Optionally at 328, the processor-based system or a component thereof, models a flight trajectory of the particular aircraft in three spatial dimensions and in a dimension of time. For example, the processor-based system or a component thereof can generate a model of a filed flight path and/or an adjusted or modified flight path with representations of the trajectories of the aircraft as the aircraft follows the filed flight path and/or adjusted or modified flight path over time. The processor-based system or a component thereof can simulate the environment of an entire airspace, all derived from ground-based data, advantageously without having to downlink or uplink to the aircraft. Such can represent flight plans as linked line segments or as segments of curves (e.g., splines, b-splines) in a three-dimensional space that represents geographic or lateral space dimensions and altitude.

The method 300 terminates at 330, until started, called or otherwise invoked again. In some implementations, the method 300 may operate continually and/or may operate as various threads on a multi-threaded processor.

Figure 4:
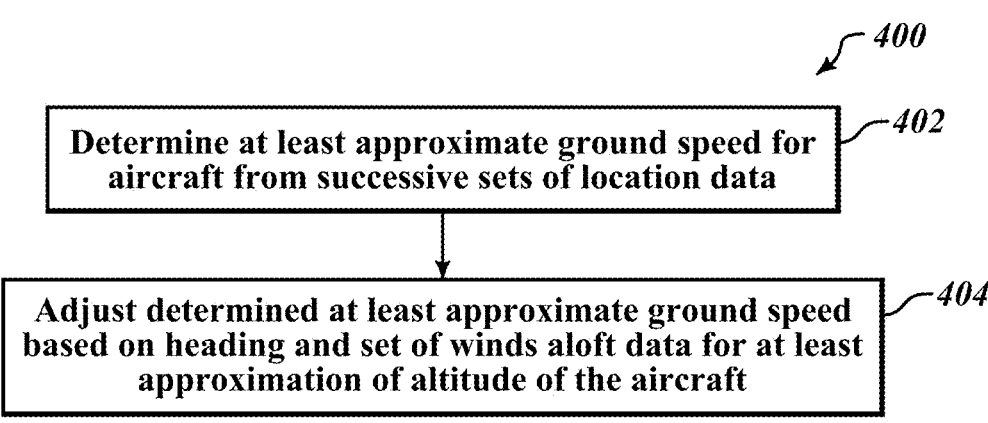
FIG. 4 is a flow diagram showing a method of operation of a processor-based system to determine or derive an at least approximate airspeed of an aircraft based on position data (e.g., GPS coordinates), according to at least one illustrated implementation, which can be employed in performing the method of FIG. 3.

FIG. 4 shows a method 400 of operation of a processor-based system to determine or derive an airspeed of an aircraft based on position data (e.g., GPS coordinates), according to at least one illustrated implementation. The method 400 can be executed as part of execution of the method 300 (FIG. 3), for example to determine an at least approximate airspeed for the particular aircraft to 312 (FIG. 3).

At 402, a processor-based system or a component thereof determines an at least approximate ground speed for the particular aircraft from successive sets of location data (e.g., from stored transponder telemetry, for instance GPS coordinates). For example, processor-executable instructions cause at least one processor to determine an at least approximate ground speed for the particular aircraft from successive sets of location data, determining a ground speed based on a distance traveled between two successive sets of location data (e.g., GPS coordinates) and an amount of time it took to travel that distance (e.g., a difference between time-stamped times for respective sets of location data).

At 404, the processor-based system or a component thereof adjusts the determined at least approximate ground speed based on a heading and based at least in part on a set of the winds aloft data (e.g., forecasted winds aloft data; adjusted winds aloft data, or three-dimensional weather model which includes forecasted winds aloft data) for an at least approximation of an altitude of the particular aircraft at the respective times. Such can also take into account air temperature and/or barometric pressure for an at least approximation of an altitude of the particular aircraft at the respective times. For example, processor-executable instructions cause at least one processor to adjust the determined at least approximate ground speed based on the heading and based at least in part on a set of the winds aloft data for an at least approximation of an altitude of the particular aircraft using vector addition to determine the heading and the airspeed based on a vector that represents the ground speed and a vector that represents the winds aloft data (e.g., forecasted winds aloft data; adjusted winds aloft data, or three-dimensional weather model which includes forecasted winds aloft data) for the altitude.

Figure 5:
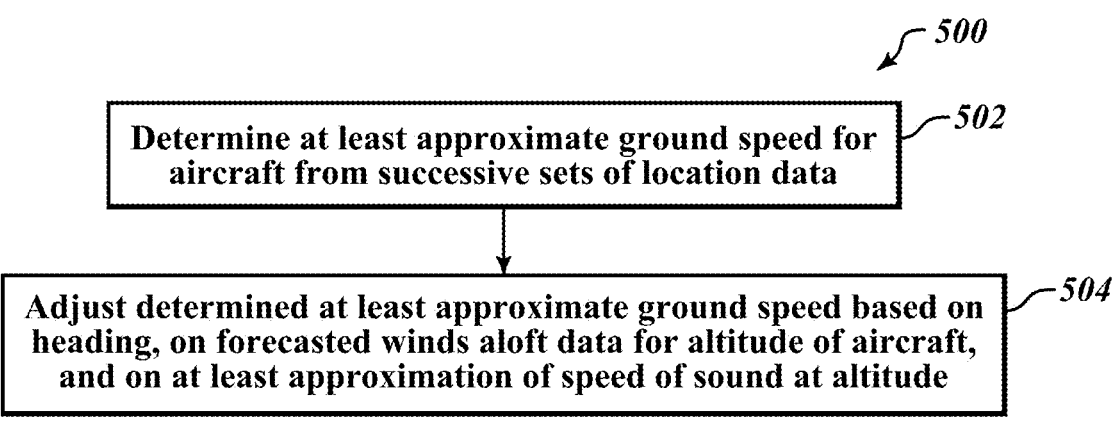
FIG. 5 is a flow diagram showing a method of operation of a processor-based system to determine or derive an at least approximate airspeed of an aircraft based on position data (e.g., GPS coordinates), according to at least one illustrated implementation, which can be employed in performing the method of FIG. 3.

FIG. 5 shows a method 500 of operation of a processor-based system to determine or derive an airspeed of an aircraft based on position data (e.g., GPS coordinates), according to at least one illustrated implementation. The method 500 can be executed as part of execution of the method 300 (FIG. 3), for example to determine an at least approximate airspeed for the particular aircraft to 312 (FIG. 3).

At 502, a processor-based system or a component thereof determines an at least approximate ground speed for the particular aircraft from successive sets of location data (e.g., from stored transponder telemetry for instance GPS coordinates). For example, processor-executable instructions cause at least one processor to determine an at least approximate ground speed for the particular aircraft from successive sets of location data. The processor-based system or a component thereof can determine a distance traveled between two geographic locations, for instance represented by respective sets of (e.g., GPS coordinates), and based on an amount of time it took the aircraft to transit between two geographic locations represented by the geographic coordinates by respective time stamps associated with the sets of geographic coordinates geographic coordinates, and thereby determine at least approximately a ground speed of the aircraft during a particular portion of a flight path.

At 504, a processor-based system or a component thereof adjusts the determined at least approximate ground speed based at least in part on a heading and based at least in part on a set of winds aloft data (e.g., forecasted winds aloft data;

adjusted winds aloft data, or three-dimensional weather model which includes forecasted winds aloft data) for an at least approximation of an altitude of the particular aircraft at the respective time, and based on an at least approximation of a speed of sound at the at least approximation of the altitude of the particular aircraft, which can be determined based on air temperature and/or barometric pressure at the altitude. For example, processor-executable instructions cause at least one processor to adjust the determined at least approximate ground speed based on the heading and on a set of winds aloft data for an at least approximation of an altitude of the particular aircraft, and based on an at least approximation of a speed of sound at the at least approximation of the altitude of the particular aircraft. The processor-based system or a component thereof can, for example, perform vector addition using a vector representations for the ground speed, the heading and the forecasted winds aloft at the altitude to determine an at least approximation of the airspeed of the aircraft over a respective portion of a flight path.

Figure 6:
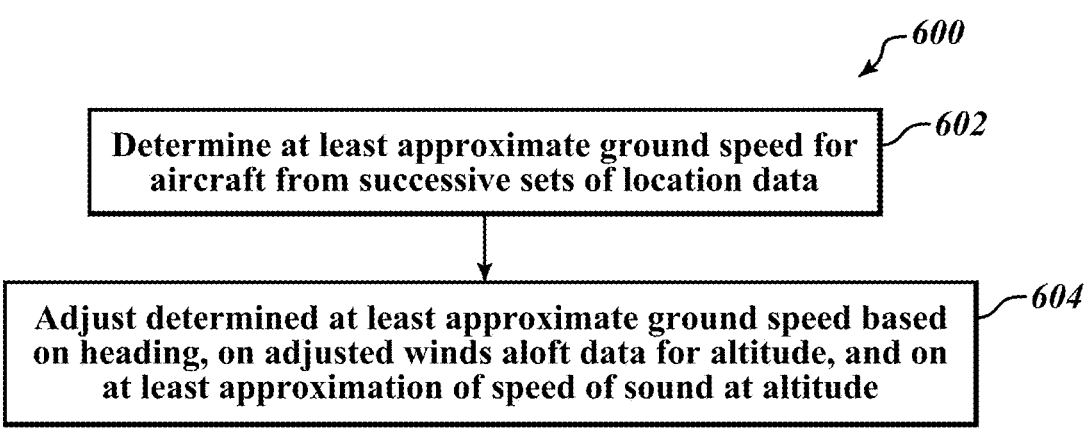
FIG. 6 is a flow diagram showing a method of operation of a processor-based system to verify, correct or adjust winds aloft data (e.g., forecasted winds aloft data) to generated adjusted winds aloft data, according to at least one illustrated implementation, which can optionally be used on its own or as part of performing the method of FIG. 3.

FIG. 6 shows a method 600 of operation of a processor-based system to verify, correct or adjust winds aloft data (e.g., forecasted winds aloft data, or three-dimensional weather model which includes forecasted winds aloft data), according to at least one illustrated implementation. The method 600 can be executed as part of execution of the method 300 (FIG. 3), for example to determine an at least approximate airspeed for the particular aircraft to 312 (FIG. 3).

At 602, a processor-based system or a component thereof determines an at least approximate ground speed for the particular aircraft from successive sets of location data (e.g., from stored transponder telemetry for instance GPS coordinates). For example, processor-executable instructions cause at least one processor to determine an at least approximate ground speed for the particular aircraft from successive sets of location data. The processor-based system or a component thereof can determine a distance traveled between two geographic locations, for instance represented by respective sets of (e.g., GPS coordinates), and can determine an amount of time it took the aircraft to transit between two geographic locations based on respective time stamps associated with the sets of geographic coordinates geographic coordinates, and thereby determine a ground speed of the aircraft during a particular portion of a flight path.

At 604, a processor-based system or a component thereof adjusts the determined at least approximate ground speed based at least in part on a heading of the aircraft, based at least in part on an adjusted set of winds aloft data for an at least approximation of an altitude of the particular aircraft, and based on an at least approximation of a speed of sound at the at least approximation of the altitude of the particular aircraft. In particular, processor-based system or a component thereof can advantageously employ an adjusted set of winds aloft data, which has been adjusted from a set of forecasted winds aloft data or three-dimensional weather model which includes forecasted winds aloft data based on real-time or almost real-time or recent data collection from various aircraft in the vicinity of the geographical location and altitude in question. Generation of adjusted winds aloft data from forecasted winds aloft data or three-dimensional weather model which includes forecasted winds aloft data is discussed in more detail elsewhere herein, for example with respect to the discussion of a method 900 (FIG. 9) below. For example, processor-executable instructions cause at least one processor to adjust the determined at least approximate ground speed based on the heading and on an adjusted set of winds aloft data for an at least approximation of an altitude of the particular aircraft, and based on an at least approximation of a speed of sound at the at least approximation of the altitude of the particular aircraft. The processor-based system or a component thereof can, for example, perform vector addition using a vector representations for the ground speed and the adjusted winds aloft data at the altitude to determine the heading and an at least approximation of the airspeed of the aircraft over a respective portion of a flight path.

When adjusting winds aloft data it may be assumed that aircraft controls are constant (e.g., autopilot engaged) or otherwise modeled and known. That way when the system computes what the extrapolated GNSS position should be using the winds aloft model, and optionally the aircraft performance model, and compares against the actual subsequent position information (e.g., GNSS position coordinates), the error measured is a direct a measure of the winds aloft model versus the actual wind and thus not unintentionally conflated with something else.

Figures 7, 8:
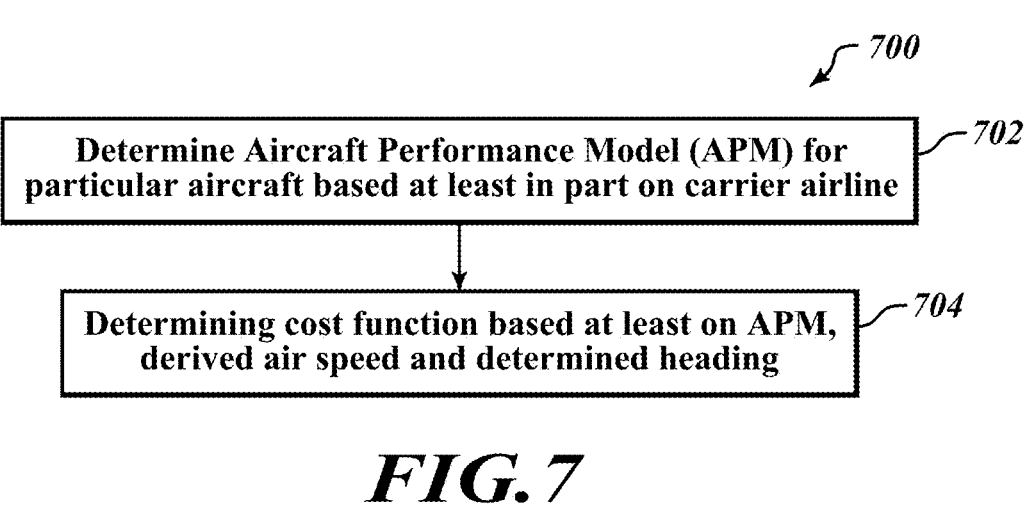
FIG. 7 is a flow diagram showing a method of operation of a processor-based system to optimize operation of an aircraft, which can be executed as part of generating a flight plan or an alternative flight plan (e.g. a revised or modified or adjusted flight plan), according to at least one illustrated implementation.
FIG. 8 is a flow diagram showing a method of operation of a processor-based system to further facilitate efficient communications with an aircraft, according to at least one illustrated implementation.

FIG. 7 shows a method 700 of operation of a processor-based system to optimized operation of an aircraft which can be executed as part of generating an alternative flight plan (e.g., a changed, revised or modified or adjusted flight plan), according to at least one illustrated implementation. The method 700 can be executed as part of execution of the method 300 (FIG. 3), for example to determine an at least approximate airspeed for the particular aircraft to 312 (FIG. 3).

At 702, a processor-based system or a component thereof determines an aircraft performance model for the particular aircraft based at least in part on a carrier airline which operates the particular aircraft. For example, processor-executable instructions cause at least one processor to determine an aircraft performance model for the particular aircraft based at least in part on the carrier airline which operates the particular aircraft, where various carrier airlines have different respective aircraft performance models with weighted parameters used to assess various operation costs of operating aircraft (e.g., fuel consumption, crew and operational costs, time in transit or transit time, distance in transit or transit distance, on time departure, on time arrival, number of missed connections). The aircraft performance model could be provided by the carrier airline, or the cost function could be derived by the at least one processor from collected and analyzed data.

At 704, a processor-based system or a component thereof generates or determines a cost function based at least on the determined aircraft performance model, a determined air speed and a determined heading of the particular aircraft. For example, processor-executable instructions can cause at least one processor to run generate or otherwise determine a cost function based at least on a cost index, which can include weight as a parameter to optimize one or more parameters and/or flight plans. Generating or determining the cost function can be based on a flight plan for the aircraft. Generating or determining the cost function can cause the at least one processor to at least one of: determine an airspeed as a function of weight, determine a fuel burn as a function of weight, determine a cost of operating aircraft, determine a fuel savings, or determine another cost.

FIG. 8 shows a method 800 of operation of a processor-based system to facilitate communications with an aircraft, according to at least one illustrated implementation. The method 800 can be executed as part of execution of the method 300 (FIG. 3), for example to determine an at least approximate airspeed for the particular aircraft to 312 (FIG. 3), or with any other method described herein.

Optionally at 802, a processor-based system or a component thereof, for each of a plurality of types of data, determines a subset of data of the respective type of data to uplink to the particular aircraft based on flight plan (e.g., filed flight plan, alternative fight plan (e.g., changed, revised or modified or adjusted flight plan). For example, processor-executable instructions cause at least one processor to, for each of a plurality of types of data, determine a subset of data of the respective type of data to uplink to the particular aircraft based on a filed flight plan. For instance, the at least one processor can determine to uplink a subset of one or more of: convective weather data, air traffic, turbulence data, restricted airspace data, winds aloft data, or adjusted winds aloft data or three-dimensional weather model which includes forecasted winds aloft data. For example, the at least one processor can determine a subset of data of the respective type of data to uplink to the particular aircraft based on a filed flight plan or an alternative fight plan (e.g., changed, revised or modified or adjusted flight plan). For instance, at least one processor can determine to uplink a subset of data that covers or corresponds to the flight path or portions thereof, for instance data that covers an area in front over or laterally along the flight path or portion thereof, thereby advantageously avoiding the cost associated with uplinking entire sets of data for a country or countries or other region or other regions in which the aircraft operates. For example, data relevant to an area or region within a defined distance along the flight path of the particular aircraft may be uplinked to the aircraft while other data of the same type not uplinked to the aircraft. Also for example, data relevant to an altitude or set of altitudes specified by the flight plan of the particular aircraft may be uplinked to the aircraft while other data of the same type not uplinked to the aircraft. Such can account for a current position of the aircraft, for example to select data to uplink for areas or regions and altitudes at or downstream of a current position along the flight plan, while data for regions and altitudes upstream of the current position along the flight plan at a given time is not uplinked.

Figure 9:
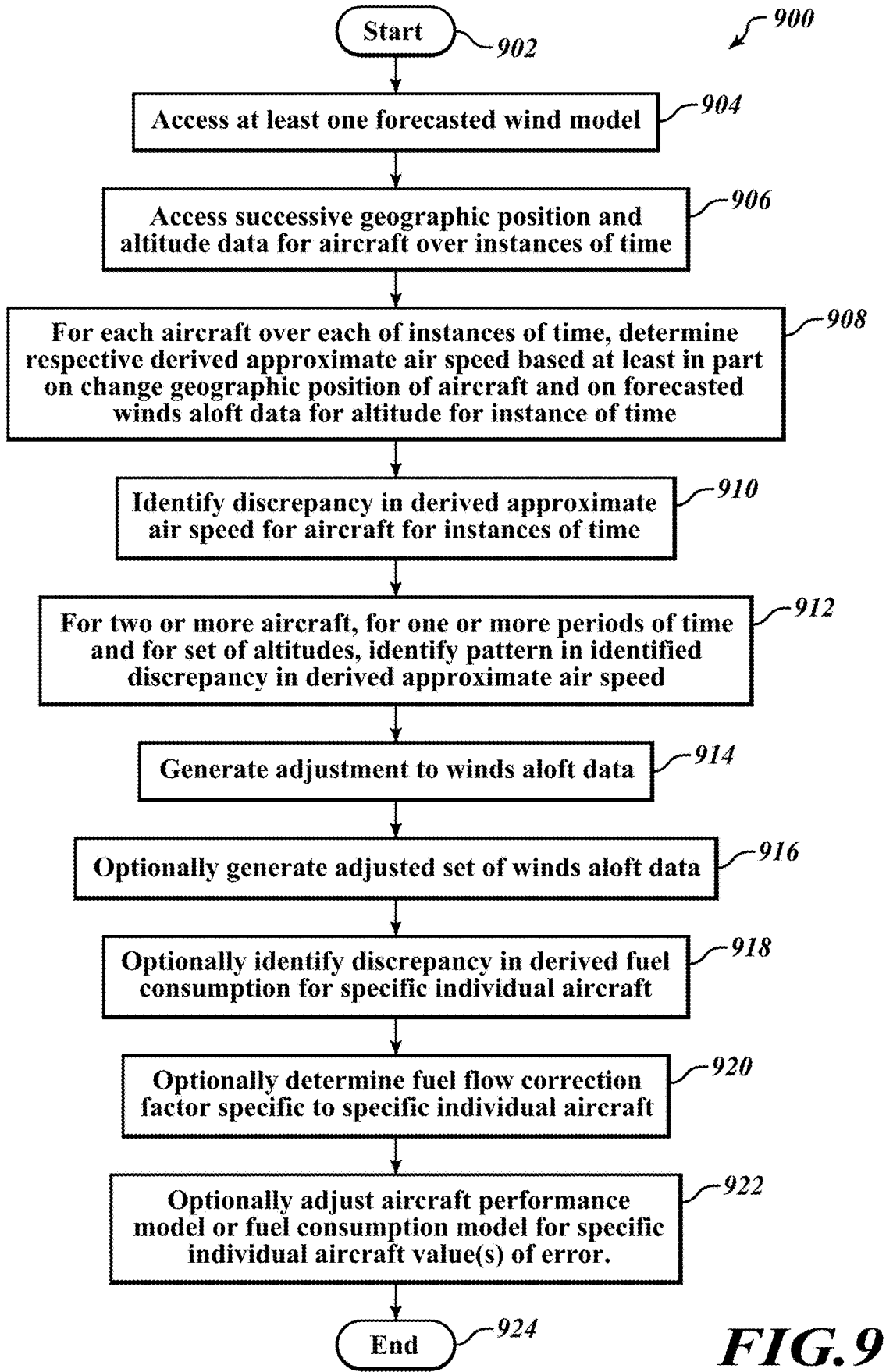
FIG. 9 is a flow diagram showing a method of operation of a processor-based system to adjust at least one of: an aircraft performance model or fuel consumption model or fuel consumption parameter for a specific individual aircraft, according to at least one illustrated implementation.

FIG. 9 shows a method 900 of operation of a processor-based system to adjust at least one of: an aircraft performance model or fuel consumption model or fuel consumption parameter for a specific individual aircraft, according to at least one illustrated implementation. The method 900 can be executed as part of execution of the method 300 (FIG. 3), for example to determine a set of adjusted winds aloft data for use in determining an at least approximate airspeed for the particular aircraft to 312 (FIG. 3), 604 (FIG. 6).

The method 900 starts at 902, for example in response to a powering ON of a system or component thereof, on a call or other invocation of a calling or invoking routine or on receipt of a request or a command, or on receipt of data.

At 904, the processor-based system or a component thereof, accesses forecasted winds aloft data, and optionally air temperature data and/or barometric pressure, for example stored by a ground-based weather information processor-based system (e.g., Aviation Digital Data Service (ADDS) operated by the Aviation Weather Center (AWC) by the National Oceanic and Atmospheric Administration (NOAA); or via a private company (e.g., WSI, FlightWX). The forecasted winds aloft data or three-dimensional weather model which includes forecasted winds aloft data represents forecasted and/or measured winds (e.g., speed, direction) at various altitudes for various geographic regions or area and for various times. Winds aloft data, air temperature and/or barometric pressure at various altitudes can advantageously be used in flight planning, and as described herein (e.g., used to derive an at least approximation of airspeed of an aircraft for a given portion of a flight plan or trajectory, based on geographic location and altitude; updating aircraft performance data or models, generating or determining updated cost functions). Thus, a ground-based flight planning or optimization system can access weather information (e.g., three-dimensional weather model, winds aloft, air temperature, barometric pressure, turbulence) stored on a ground-based weather information processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited.

At 906, a processor-based system or a component thereof accesses successive geographic position and altitude data for each of a plurality of aircraft over a plurality of instances of time. For example, processor-executable instructions cause at least one processor to access successive geographic position and altitude data for each of a plurality of aircraft over a plurality of instances of time. The successive geographic position and altitude data represent, at each successive instance of time, a respective geographic position and an at least approximation of altitude of the respective aircraft at the respective instance of time. The at least one processor can, for example retrieve transponder telemetry from a tracking ground-based processor-based system. The sets of transponder telemetry can be collected and/or stored by the ground-based aircraft tracking processor-based system from transponder telemetry sent from transponders carried by the aircraft as is current practice in at least most regions in the world. The one or more sets of transponder telemetry can include, for each respective one of a plurality of instances of time, a respective time-stamped set of global navigation system positioning coordinates (e.g., GPS coordinates, GLONASS coordinates, GALILEO coordinates, BEIDOU coordinates, QZSS coordinates, IRNSS coordinates), a respective altitude value (e.g., respective pressure altitude value), and a unique aircraft identifier (e.g., tail number) supplied by a transponder (e.g., global navigation network transponder) on the particular aircraft. The aircraft (e.g., transponder or receiver) receives global navigation signals from various satellites of a global navigation system network (e.g., GPS network, GLONASS network, GALILEO network, BEIDOU network, QZSS network, IRNSS network). Global navigation system positioning coordinates can be determined via a global navigation system radio or receiver on-board the particular aircraft, which may form part of, or otherwise be communicatively coupled with the transponder. Thus, a ground-based flight planning or optimization system can access transponder telemetry stored on a ground-based aircraft tracking processor-based system (e.g., server computer system) that is separate and distinct from the ground-based flight planning or optimization system, via conventional communications channels (e.g., wired, wireless, packetized, Internet) which unlike communications with aircraft are not particularly bandwidth limited.

At 908, a processor-based system or a component thereof for each of the plurality of aircraft over each of the plurality of instances of time, determine a respective derived approximate air speed for the respective aircraft based at least in part on a change in the geographic position of the respective aircraft, duration of time to achieve the change in geographic position, and based at least in part on a set of winds aloft data (e.g., forecasted winds aloft data; adjusted winds aloft data or three-dimensional weather model which includes forecasted winds aloft data) for the at least approximation of altitude of the respective aircraft for the respective instance of time. For example, processor-executable instructions cause at least one processor to, for each of the plurality of aircraft over each of the plurality of instances of time, determine a respective derived approximate air speed for the respective aircraft based at least in part on a change in the geographic position of the respective aircraft, on an amount of time to achieve the change in the geographic position, and at least in part on a set of forecasted winds aloft data or three-dimensional weather model which includes forecasted winds aloft data for the at least approximation of altitude of the respective aircraft for the respective instance of time. As previously explained, the at least one processor can, for example, determine an at least approximate ground speed for the particular aircraft from successive sets of geographic position data and a transit time, and adjust the determined at least approximate ground speed based on a set of winds aloft data or three-dimensional weather model which includes forecasted winds aloft data for the at least approximation of altitude of the respective aircraft, and optionally based on an at least approximation of a speed of sound at the at least approximation of the altitude of the respective aircraft.

At 910, a processor-based system or a component thereof identifies a discrepancy in the respective derived approximate air speed for one or more of aircraft of the plurality of aircraft for one or more instances of time. For example, processor-executable instructions cause at least one processor to identify a discrepancy in the respective derived approximate air speed for one or more of aircraft of the plurality of aircraft for one or more instances of time. For instance, the at least one processor can compare the derived airspeed for the respective aircraft for the respective instance of time with an instrumented airspeed for the respective aircraft for the respective instance of time, where instrumented airspeed is available either in real time or almost real time, or is available after completion of one or more flights, for instance while the aircraft is in the ground (e.g., from a flight recorder).

At 912, a processor-based system or a component thereof, for two or more of the of aircraft of the plurality of aircraft, for one or more periods of time that encompass the respective instances of time, for one or more defined areas that encompass the respective geographic positions of the respective aircraft, and for a defined set of altitudes that encompasses the respective at least approximation of altitude of the respective aircraft, identifies a pattern in respective ones of the identified discrepancy or discrepancies in the respective derived approximate air speed for one or more of aircraft of the plurality of aircraft. For example, processor-executable instructions cause at least one processor to: for two or more of the of aircraft of the plurality of aircraft, for one or more periods of time that encompass the respective instances of time, for one or more defined areas that encompass the respective geographic positions of the respective aircraft, and for a defined set of altitudes that encompasses the respective at least approximation of altitude of the respective aircraft, identify a pattern in respective ones of the identified discrepancy in the respective derived approximate air speed for one or more of aircraft of the plurality of aircraft. The periods of time can be sufficiently small (e.g., 10 minutes, 30 minutes) such that changes in wind speed within the period of time should not be too significant. Likewise, defined areas can be sufficiently small (e.g., 25 square miles, 50 square miles) such that changes in wind speed within the area should not be too significant. Likewise, sets of altitudes can be sufficiently small (e.g., 200 feet, 400 feet) such that changes in wind speed within the set of altitudes should not be too significant. Thus, for example, the at least one processor can, for each of at least two of the plurality of aircraft and for at least one pair of the successive instances of time, identify a discrepancy between the respective derived approximate air speed for at least one pair of successive instances of time, or identify a pattern of in the identified discrepancy between the respective derived approximate air speed for at least one pair of successive instances of time for at least two of the plurality of aircraft, where the pattern indicative of a consistent error in set of forecasted winds aloft data or three-dimensional weather model which includes forecasted winds aloft data at least for the respective altitude.

Alternatively, the processor-based system or a component thereof can identify a pattern for example by deriving a parameter from the winds aloft and positional data (e.g., geographic position, geographic altitude), where the derived parameter corresponds to a parameter that is reported from a ground-based source (e.g., ADSB-Exchange). The processor-based system or a component thereof can the back-propagate a difference of the derived and reported parameters as an error or an offset for the winds aloft data. This error or offset could then be applied to winds aloft data for other aircraft in the vicinity of the aircraft for which the parameter was derived.

Alternatively, the processor-based system or a component thereof can identify a pattern that employs a different parameter, for example a Mach number. Such could include deriving or otherwise computing an airspeed. Alternatively, the processor-based system or a component thereof can calculate the parameter directly from reported wind speed and direction values.

At 914, a processor-based system or a component thereof generates an adjustment to the set of winds aloft data (e.g., forecasted winds aloft data, previously adjusted winds aloft data or three-dimensional weather model which includes forecasted winds aloft data), at least for the respective approximation of altitude and for the respective defined area, based on the identified pattern in respective ones of the identified discrepancy in the respective derived approximate air speed. For example, processor-executable instructions cause at least one processor to generate an adjustment to the set of winds aloft data, at least for the respective approximation of altitude and for the respective defined area, based on the identified pattern in respective ones of the identified discrepancy in the respective derived approximate air speed. For instance, the at least one processor can determine that the forecasted winds aloft data or previously adjusted winds aloft data is inconsistent with what two, more, or all aircraft flying during a particular time range, in a particular geographic area and at a particular range of altitudes are experiencing. In some implementations, the at least one processor can identify a consistent inconsistency, for example that the respective derived airspeeds that were based on the forecasted winds aloft data or previously adjusted winds aloft data are all off by approximately 5 mph from 145 degrees. Since the headings of each of the aircraft may be different, the at least one processor accommodates for the different headings. For instance, where a first aircraft is heading due East and an associated discrepancy indicates that the derived airspeed of the first aircraft is slow by 5 mph and a second aircraft is heading due West and an associated discrepancy indicates that the derived airspeed of the second aircraft is fast by 5 mph, the is an exact match in the discrepancy indicating that the forecasted or previously adjusted winds aloft for that time, geographic area and altitude is consistently off by a 5 mph from West to East. Various different headings can be resolved by the at least one processor using vector addition. Such indicates that the forecasted winds aloft data or previously adjusted winds aloft data on which the derived airspeed were based is incorrect or off, and would benefit by being adjusted. Such also indicates the amount and direction (e.g., vector representation) of the adjustment.

At 916, a processor-based system or a component thereof optionally generates an adjusted set of winds aloft data based on the identified pattern in respective ones of the identified discrepancy in the respective derived approximate air speed. For example, processor-executable instructions cause at least one processor to optionally generate an adjusted set of winds aloft data based on the identified pattern in respective ones of the identified discrepancy in the respective derived approximate air speed. For instance, the at least one processor generates an adjusted set of winds aloft data that compensates for the identified or determined discrepancies.

Optionally at 918, a processor-based system or a component thereof identifies a discrepancy in a derived or determined fuel consumption for a specific individual aircraft. For example, processor-executable instructions cause at least one processor to identify a discrepancy in the derived or determined fuel consumption over a portion or all of one or more flights of the specific individual aircraft, for instance in comparison with an instrumented or measured fuel consumption over a portion or all of one or more flights of the specific individual aircraft. The instrumented fuel consumption can in some implementations be available in real time or almost real time, or is available after completion of one or more flights, for instance while the aircraft is in the ground (e.g., from a flight recorder). The instrumented fuel consumption can, for example, be captured or measured by one or more sensors (e.g., capacitive sensors that measure weight or volume of fuel in fuel tanks) positioned to sense or measure a volume of fuel in the fuel tanks.

At 920, a processor-based system or a component thereof optionally determines a fuel flow correction factor that is specific to the specific individual aircraft. For example, processor-executable instructions cause at least one processor to optionally determine a fuel flow correction factor that corrects an aircraft performance model and, or, a fuel consumption model (e.g., correction to a fuel consumption equation or fuel consumption parameter) that is specific to the specific individual aircraft, based on the identified discrepancy in the derived or determined fuel consumption for a specific individual aircraft.

At 922, a processor-based system or a component thereof optionally adjusts at least one of: an aircraft performance model for the specific individual aircraft and, or a fuel consumption model for the specific individual aircraft based at least in part on the determined at least one value of error. For example, processor-executable instructions cause at least one processor to optionally adjust at least one of: an aircraft performance model for the specific individual aircraft and, or a fuel consumption model for the specific individual aircraft based at least in part on the determined at least one value of error.

The method 900 terminates at 924, until started, called or otherwise invoked again. In some implementations, the method 900 may operate continually and/or may operate as various threads on a multi-threaded processor.

Figure 10:
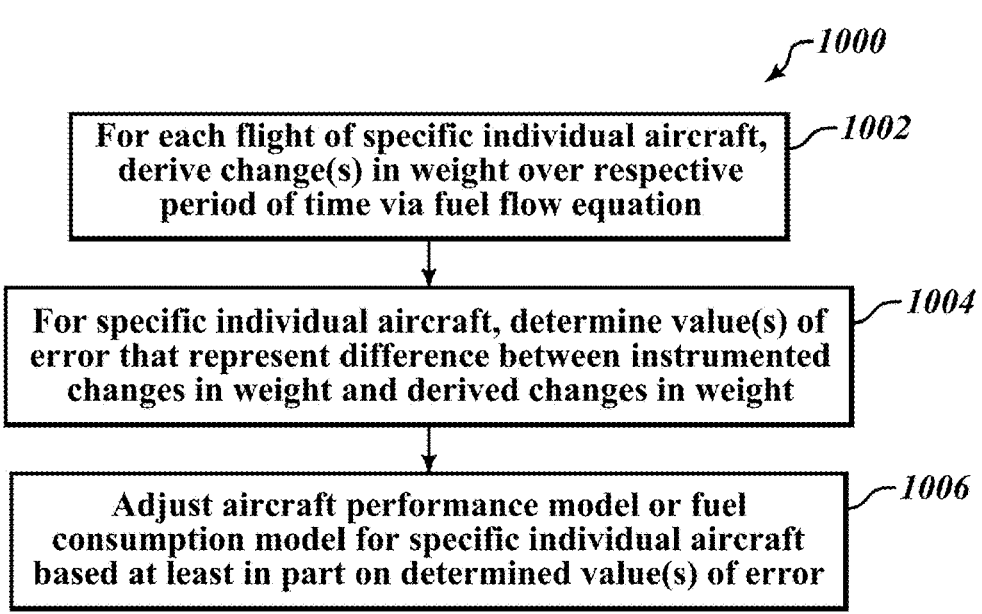
FIG. 10 is a flow diagram showing a method of operation of a processor-based system to compare derived changes in weight with instrumented changes in weight, according to at least one illustrated implementation.

FIG. 10 shows a method 1000 of operation of a processor-based system, according to at least one illustrated implementation. The method 1000 can be executed as part of execution of the method 900 (FIG. 9), for example to identify a discrepancy in derived fuel consumption 918 and adjust an aircraft performance model or fuel flow model 920 (FIG. 9).

At 1002, a processor-based system or a component thereof, for each of a plurality of flights of a specific individual aircraft, derives at least one derived change in a weight of the specific individual aircraft via a fuel flow equation. Each of the derived changes in the weight of the specific individual aircraft represent a respective calculated change in a weight of the specific individual aircraft over a respective period of time of at least one period of time, for the respective flight of a plurality of flights of the specific individual aircraft. For example, processor-executable instructions cause at least one processor to, for each of a plurality of flights of a specific individual aircraft, derive at least one derived change in a weight of the specific individual aircraft via a fuel flow equation. For almost all aircraft and almost all flights the only significant change in weight is attributable to fuel consumption. Fuel consumption is typically a primary factor in operating cost, and hence in optimizing flight plans or optimizing alternative flight plans (e.g., changes, adjustments or modifications or revisions to flight plans). In order to derive at least one derived change in a weight of the specific individual aircraft via a fuel flow equation, the at least one processor can, for each of the plurality of flights of the specific individual aircraft, derive a plurality of changes in the weight of the specific individual aircraft via the fuel flow equation, each of the derived changes in the weight of the specific individual aircraft representing a respective calculated change in the weight of the fuel carried by the specific individual aircraft over a respective period of time of a plurality of periods of time for the respective flight of the plurality of flights of the specific individual aircraft.

At 1004, a processor-based system or a component thereof for the specific individual aircraft, determines at least one value of error that represents a difference between a number of instrumented changes in weight and a number of the derived changes in the weight of the specific individual aircraft. The instrumented changes in weight are based on instrumented fuel readings collected via one or more sensors on-board the specific individual aircraft and operable to sense or measure a volume of fuel in the fuel tanks of the aircraft. The instrumented changes in weight can be downloaded from the aircraft while the aircraft is on the ground, for example downloaded from the flight data recorder 134 (FIG. 1) via a wired connection of hardware interface or port (e.g., USB port). For example, processor-executable instructions cause at least one processor to, for the specific individual aircraft, determine at least one value of error that represents a difference between a number of instrumented changes in weight and a number of the derived changes in the weight of the specific individual aircraft. The instrumented changes in weight of the specific individual aircraft can be represented as respective changes in the weight of only fuel over respective periods of time. In some implementations, the at least one processor can, for example, perform a least squares regression analysis on the derived changes in weight and the instrumented changes in weight to determine at least one value of error.

Such can, for example, be implemented as a batch optimization process using a least squares analysis to quantify the error of the governing fuel flow equation. Such could, for instance include: periodically recording the instrumented weight of an aircraft or volume of fuel held in the tanks of the aircraft while flying via a flight recorder. For each instrumented weight change A, and derived weight change derived using a fuel flow equation D, in time, the at least one processor can set the squared error as $(A-f(B1, B2, \ldots Bn, D))^2$, where $f(B1, B2, \ldots Bn, D)$ is a line, parabola, etc. The at least one processor can then sum the squared error for each pair (A, D) to be assessed, and take the derivatives of the sum with respect to $B1, B2, \ldots Bn$ individually. Finally, the at least one processor can set each derivative equal to 0, and solve the system of equations for all $B1, B2, \ldots Bn$. This simple least squares regression could be performed for each specific individual aircraft (e.g., each unique tail number) over relatively large data sets to get the best generalization for $B1, B2, B3, \ldots Bn$ obtainable. The instrumented weights could be provided or collected in real-time, or alternatively the instrumented weights could be provided after specific flights, for instance while the aircraft is on the ground. Either way, the batch optimization as a whole could be performed over multiple flights of recorded data for a specific individual aircraft (e.g., each unique tail number).

At 1006, a processor-based system or a component thereof adjusts at least one of: an aircraft performance model for the specific individual aircraft or a fuel consumption model for the specific individual aircraft based at least in part on the determined at least one value of error. For example the processor-based system or a component thereof can adjust a fuel consumption equation or parameter to eliminate or reduce the identified error.

Figure 11:
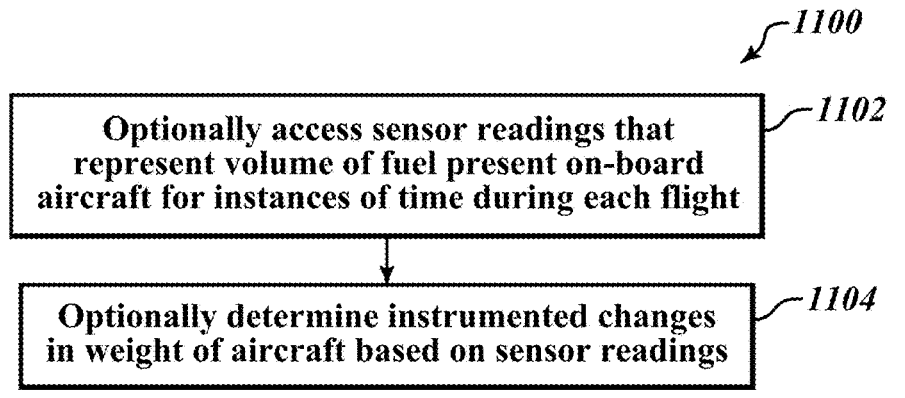
FIG. 11 is a flow diagram showing a method of operation of a processor-based system to determine instrumented changes in weight of an aircraft based on sensor readings that represent a volume of fuel present on-board the aircraft at various times, according at least one illustrated implementation, which can be used in performing the method of FIG. 10.

FIG. 11 shows a method 1100 of operation of a processor-based system to determine instrumented changes in weight of an aircraft based on sensor readings that represent a volume of fuel present on-board the aircraft, according at least one illustrated implementation. The method 1100 can, for example, be executed as part of execution of the method 1000 (FIG. 10).

At 1102, a processor-based system or a component thereof optionally accesses a set of sensor readings that represent a volume of fuel present on-board the specific individual aircraft for at least two instances of time during each of the plurality of flights. For example, processor-executable instructions cause at least one processor to optionally when executed, the processor-executable instructions cause the at least one processor to: access a set of sensor readings, for example from a flight data recorder, where the sensor readings represent, for example, a volume of fuel present on-board the specific individual aircraft for at least two instances of time during each of the plurality of flights.

At 1104, a processor-based system or a component thereof optionally determines each of the number of instrumented changes in weight of the specific individual aircraft based on the sensor readings that represent the volume of fuel present on-board the specific individual aircraft for at least two instances of time during each of the plurality of flights. For example, processor-executable instructions cause at least one processor to optionally determine each of the number of instrumented changes in weight of the specific individual aircraft based on the sensor readings that, for example, represent the volume of fuel present on-board the specific individual aircraft for at least two instances of time during each of the plurality of flights.

Figure 12:
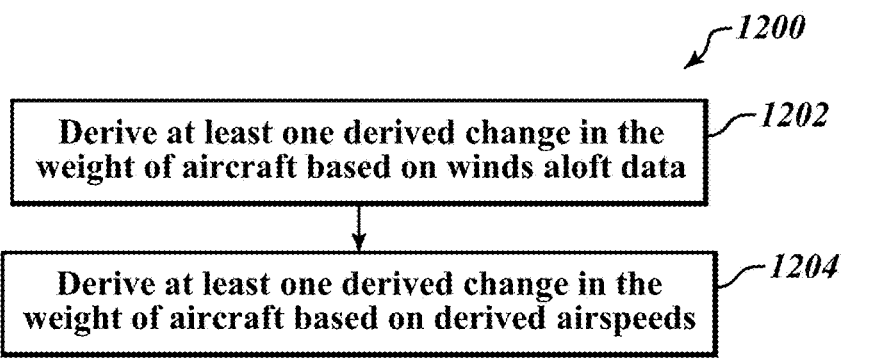
FIG. 12 is a flow diagram showing a method of operation of a processor-based system to derive changes in weight for an aircraft, according to at least one illustrated implementation, the derived airspeed can be used with various other of the methods described herein.

FIG. 12 shows a method 1200 of operation of a processor-based system to determine instrumented changes in weight of an aircraft based on sensor readings that represent a volume of fuel present on-board the aircraft, according at least one illustrated implementation. The method 1100 can, for example, be executed as part of execution of the method 1000 (FIG. 10).

At 1202, a processor-based system or a component thereof causes the at least one processor to derive at least one derived change in the weight of the specific individual aircraft based at least in part of a set of winds aloft data or three-dimensional weather model which includes forecasted winds aloft data. Winds significantly affect fuel consumption. For instance a tail wind will significantly reduce fuel consumption as compared to zero wind, while a head wind will significantly reduce fuel consumption as compared to zero wind. Cross winds also have an effect on fuel consumption. As noted, any change in weight of an aircraft is typically a result of fuel consumption. Thus, winds aloft data or three-dimensional weather model which includes forecasted winds aloft data can be used, at least, in part, in deriving at least one derived change in the weight of the specific individual aircraft. For example, processor-executable instructions cause at least one processor to cause the at least one processor to: derive at least one derived change in the weight of the specific individual aircraft based at least in part of a set of forecasted winds aloft data and, or adjusted winds aloft data.

At 1204, a processor-based system or a component thereof causes the at least one processor to derive at least one derived change in the weight of the specific individual aircraft based at least in part of a set of derived airspeeds. Airspeeds significantly affect fuel consumption. Thus, airspeed (e.g., derived airspeed, instrumented airspeed) can be used, at least, in part, in deriving at least one derived change in the weight of the specific individual aircraft. For example, processor-executable instructions cause at least one processor to cause the at least one processor to: derive at least one derived change in the weight of the specific individual aircraft based at least in part of a set of derived airspeeds.

Based on the above, at least some aspects of this application can be summarized as accurately deriving approximate flight characteristics (e.g., airspeed heading, Mach speed) for a specific aircraft by a ground-based system using location and altitude information, which is advantageously performed with minimal or even no access to instrumented data from the instruments of the aircraft (e.g., relying on GPS data or transponder data) and thereby advantageously minimizing or even avoiding downlinking instrumented data from the instruments of the aircraft using costly aircraft-to-ground (e.g., radios) or aircraft-to-satellite-to-ground communications systems (e.g., radios); determining ground speed based on same; determining airspeed and heading based on determined ground speed, heading, tail number specific aircraft performance data and winds aloft data). The location and altitude data advantageously represent actual physical locations and altitudes of an aircraft in flight, as opposed to representing an "intended flight plan" or a "simulated flight plan." The location and altitude data may advantageously be derived from non-instrumented data (e.g., global positioning data such as GPS or GNSS data, transponder data, winds aloft data) rather than being instrumented data sensed or collected by conventional aircraft instruments (e.g., airspeed indication, altimeter, heading indicator, climb indicator) aboard the particular aircraft and downloaded from the aircraft to the ground-based system(s). The non-instrumented data used by the ground-based system(s) can, for example take the form of real time or almost real time data, for instance a stream of 3D points from GPS and, or, an aircraft transponder and winds aloft data. Again, this may advantageously reduce expensive and complicated communications between the aircraft and the ground. Thus, derivation of the air data (TAS/CAS, Mach, etc.) can advantageously be based purely on the GPS/GNSS data and/or winds aloft data and/or from any similar computations that may happen in the cockpit.

In at least some implementations, a ground-based system can also determine an Inferred Cost Index (ICI) or Derived Cost Index based on the derived approximate flight characteristics. For example, the above described derived air data can be used to advantageously infer a flown cost index. For instance, with enough QAR data or manufacturer performance data, a ground-based system can compute an inferred or derived cost index based on a derived Mach number, an altitude, a head wind and a gross weight of a particular aircraft. Such may be a highly valuable calculation to report back to a carrier airline as many carrier airlines do not have visibility into the real-time cost index and rather rely on pilots to respect filed values. In many cases, it has been observed that pilots stray from filed flight plans and hence higher-than-filed inferred or derived cost indices are incurred by the pilot operation, which means more fuel burned than the carrier airline anticipated in the filed flight plan.

Figure 13:
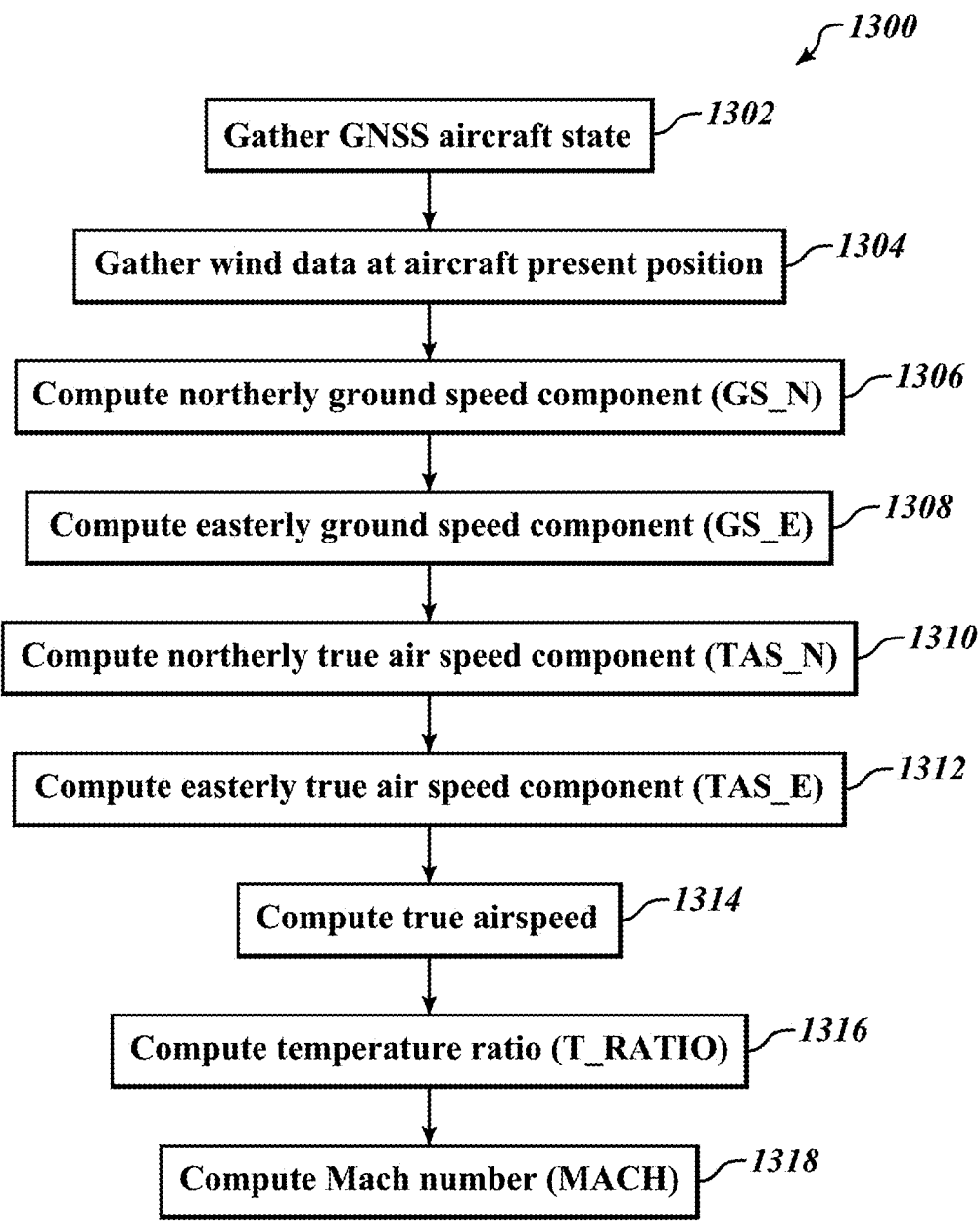
FIG. 13 is a flow diagram showing a method of operating a ground-based processor-based system to determine an inferred or derived cost index, according to at least one illustrated implementation.

FIG. 13 shows a method 1300 of operating a ground-based processor-based system to determine various values from which an inferred or derived cost index can be determined, according to at least one illustrated implementation. The below discussion assumes that: airspeeds are represented in knots, angles are represented in radians, and temperatures represented in degrees Kelvin, and further assumes that the wind is traveling toward is northerly or easterly vector components.

In particular, the method 1300 illustrates a derivation of Mach using the limited sources previously described (e.g., derivation of Mach number and calibrated air speed as a function of three dimensional position and winds aloft where three dimensional position can be ascertained from GNSS or aircraft transponder data). In operation, determining an inferred or derived cost index can include building a table of known cost index values as a function of Mach, gross weight, altitude, head-wind and ISA temperature deviation from either manufacturer performance data or a large amount of observed operational data for a given aircraft type. Building this table is a pre-processing act and can be entirely observational. A cost index is then inferred or derived in real-time using the current Mach, gross weight, altitude, head-wind and ISA temperature deviation to interpolate along the axes of the cost index table.

At 1302, a processor-based system gathers three-dimensional position information, for example a GNSS aircraft state. Such can, for example, include: Latitude (lat), Longitude (lon), and Altitude (alt). Such can also include Ground speed (gs) and True track heading (trk).

At 1304, a processor-based system gathers wind data at the present position of the aircraft. Such can, for example, include: Northerly wind speed (ws_n), Easterly wind speed (ws_e), and Static air temperature (sat).

At 1306, a processor-based system computes or otherwise determines a northerly ground speed component (gs_n), for instance as gs_n=gs*cos(trk).

At 1308, a processor-based system computes or otherwise determines Compute easterly ground speed component (gs_e), for instance as. gs_e=gs*sin(trk).

At 1310, a processor-based system computes or otherwise determines Compute northerly true air speed component (tas_n), for instance as tas_n=gs_n−ws_n.

At 1312, a processor-based system computes or otherwise determines easterly true air speed component (tas_e), for instance as tas_e=gs_e−ws_e.

At 1314, a processor-based system computes or otherwise determines true airspeed, for instance as tas=sqrt(tas_n^2+ tas_e^2).

At 1316, a processor-based system computes or otherwise determines temperature ratio (t_ratio), for instance as t_ratio=sat/288.15.

At 1318, a processor-based system computes or otherwise determines Mach number (mach), for instance as mach=tas/ (661.4786*sqrt(t_ratio)).

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including: U.S. provisional patent application No. 63/035,149 including its appendix; U.S. application Ser. No. 17/338,051, published as U.S. 2021/0383708; U.S. application Ser. No. 17/338,203, published as U.S. 2021/0383706; International (PCT) Application Serial No. PCT/US2021/035866, published as WO 2021/247980; International (PCT) Application Serial No. PCT/US2021/035882, published as WO 2021/247985; and U.S. provisional patent application No. 63/538,919 filed Sep. 18, 2023, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

We claim:

1. A method of operation of processor-based system, comprising:

accessing a flight plan for a particular aircraft by the processor-based system;

accessing one or more sets of location and altitude information for the particular aircraft by the processor-based system, the one or more sets of location and altitude information each specifying a location and an altitude for the particular aircraft at a respective time;

accessing winds aloft data by the processor-based system; and determining an at least approximate airspeed and a heading for the particular aircraft by the processor-based system based at least in part on the one or more sets of location and altitude information for the particular aircraft and based at least in part on the winds aloft data, wherein accessing one or more sets of location and altitude information for the particular aircraft by the processor-based system comprises: retrieving, by the processor-based system from a tracking ground-based processor-based system, one or more sets of transponder telemetry for the particular aircraft stored by the tracking ground-based processor-based system, the one or more sets of transponder telemetry including, for each respective one of a plurality of instances of time, a respective time-stamped set of global positioning coordinates, a respective pressure altitude value, and a unique aircraft identifier supplied by a transponder on the particular aircraft.

2. The method of claim 1 wherein determining an at least approximate airspeed for the particular aircraft comprises determining an at least approximate ground speed for the particular aircraft by determining an at least approximate ground speed for the particular aircraft from successive sets of location data, adjusting the determined at least approximate ground speed based on the heading and based at least in part on a set of the winds aloft data for an at least approximation of an altitude of the particular aircraft.

3. The method of claim 1 wherein determining an at least approximate airspeed for the particular aircraft comprises determining an at least approximate Mach speed for the particular aircraft by determining an at least approximate ground speed for the particular aircraft from successive sets of location data, adjusting the determined at least approximate ground speed based on the heading and on a set of winds aloft data for an at least approximation of an altitude of the particular aircraft, and based on an at least approximation of a speed of sound at the at least approximation of the altitude of the particular aircraft.

4. The method of claim 1 wherein determining an at least approximate airspeed for the particular aircraft comprises determining an at least approximate Mach speed for the particular aircraft by determining an at least approximate ground speed for the particular aircraft from successive sets of location data, adjusting the determined at least approximate ground speed based on the heading and on a set of adjusted winds aloft data for an at least approximation of an altitude of the particular aircraft, and based on an at least approximation of a speed of sound at the at least approximation of the altitude of the particular aircraft.

5. The method of claim 4, further comprising:
adjusting a set of forecasted winds aloft data to produce the set of adjusted winds aloft data.

6. The method of claim 1, further comprising:
accessing aircraft performance data for the particular aircraft by the processor-based system.

7. The method of claim 6 wherein accessing aircraft performance data for the particular aircraft by the processor-based system comprises accessing an aircraft performance model that is specific to an individual aircraft.

8. The method of claim 7 wherein accessing a flight plan for a particular aircraft comprises: retrieving the flight plan from a ground-based flight plan processor-based system that stores one or more previously filed flight plans.

9. The method of claim 8, further comprising:
accessing convective weather data by the processor-based system;
accessing restricted airspace data by the processor-based system; and
generating an alternative flight plan, by the processor-based system, based at least in part on the convective weather data and based at least in part on the restricted airspace data.

10. The method of claim 9, wherein generating an alternative flight plan includes:
determining an optimization for the alternative flight plan, by the processor-based system, based at least in part on the aircraft performance data for the particular aircraft, based at least in part on the convective weather data and based at least in part on the restricted airspace data.

11. The method of claim 10, further comprising:
communicating the alternative flight plan by the processor-based system to a dispatch processor-based system.

12. The method of claim 11, further comprising:
causing the alternative flight plan to be loaded to flight management computer of the particular aircraft to control the particular aircraft.

13. The method of claim 6, further comprising:
determining an aircraft performance model for the particular aircraft based at least in part on an airline which operates the particular aircraft; and
determining a cost function, by the processor-based system based at least on the determined aircraft performance model, a determined air speed and a determined heading of the particular aircraft.

14. The method of claim 13 wherein determining an aircraft performance model for the particular aircraft based includes determining an aircraft performance model for the particular aircraft based that represents at least one of: a speed as a function of weight, a fuel burn as a function of weight, a cost of operating aircraft, a fuel savings, or another cost.

15. The method of claim 1, further comprising:
modeling a flight trajectory of the particular aircraft in three spatial dimensions and in a dimension of time.

16. The method of claim 1, further comprising:
for each of a plurality of types of data, determining a subset of data of the respective type of data to uplink to the particular aircraft based on a filed flight plan.

17. The method of claim 16 wherein the types of data include one or more of convective weather data, air traffic, turbulence, restricted airspace data, winds aloft data, or adjusted winds aloft data, and determining a subset of data of the respective type of data to uplink to the particular aircraft based on a filed flight plan comprises determining a subset of the respective type of data within a defined distance along a flight path of the particular aircraft.

18. The method of claim 1 wherein the processor-based system is one of: i) a ground-based processor-based system, or ii) an aircraft-based processor-based system that is not communicatively coupled to a bus that carries instrumented data, and wherein determining an at least approximate airspeed for the particular aircraft by the processor-based system occurs repeatedly during a flight of the particular aircraft.

19. A processor-based system, comprising:
at least one processor; and
at least one nontransitory processor-readable media communicatively coupled to the at least one processor and which stores processor-executable instructions which, when executed by the at least one processor, cause the at least processor to:
access a flight plan for a particular aircraft by the processor-based system;
access one or more sets of location and altitude information for the particular aircraft by the processor-based system, the one or more sets of location and altitude information each specifying a location and an altitude for the particular aircraft at a respective time;
access winds aloft data by the processor-based system; and
determine an at least approximate airspeed and a heading for the particular aircraft by the processor-based system based at least in part on the one or more sets of location and altitude information for the particular aircraft and based at least in part on the winds aloft data,
wherein to access one or more sets of location and altitude information for the particular aircraft the processor-based system retrieves from a tracking ground-based processor-based system, one or more sets of transponder telemetry for the particular aircraft stored by the tracking ground-based processor-based system, the one or more sets of transponder telemetry including, for each respective one of a plurality of instances of time, a respective time-stamped set of global positioning coordinates, a respective pressure altitude value, and a unique aircraft identifier supplied by a transponder on the particular aircraft.

20. The processor-based system of claim 19, wherein to determine an at least approximate airspeed for the particular aircraft, when executed, the processor-executable instructions cause the at least one processor to determine an at least approximate ground speed for the particular aircraft from successive sets of location data and adjust the determined at least approximate ground speed based on the heading and based at least in part on a set of the winds aloft data for an at least approximation of an altitude of the particular aircraft.

21. The processor-based system of claim 19, wherein to determine an at least approximate airspeed for the particular aircraft, when executed, the processor-executable instructions cause the at least one processor to determine an at least approximate ground speed for the particular aircraft from successive sets of location data and adjust the determined at least approximate ground speed based on the heading and on a set of winds aloft data for an at least approximation of an altitude of the particular aircraft, and based on an at least approximation of a speed of sound at the at least approximation of the altitude of the particular aircraft.

22. The processor-based system of claim 19, wherein to determine an at least approximate airspeed for the particular aircraft, when executed, the processor-executable instructions cause the at least one processor to determine an at least approximate ground speed for the particular aircraft from successive sets of location data and adjust the determined at least approximate ground speed based on the heading and on a set of adjusted winds aloft data for an at least approximation of an altitude of the particular aircraft, and based on an at least approximation of a speed of sound at the at least approximation of the altitude of the particular aircraft.

23. The processor-based system of claim 22, wherein, when executed, the processor-executable instructions cause the at least one processor to:
adjust a set of forecasted winds aloft data to produce the set of adjusted winds aloft data.

24. The processor-based system of claim 19, wherein, when executed, the processor-executable instructions cause the at least one processor to:
access convective weather data;
access restricted airspace data; and
generate an alternative flight plan based at least in part on the convective weather data and based at least in part on the restricted airspace data.

25. The processor-based system of claim 24, wherein, when executed, the processor-executable instructions cause the at least one processor to:
determine an optimization for the alternative flight plan based at least in part on a set of aircraft performance data for the particular aircraft, based at least in part on the convective weather data and based at least in part on the restricted airspace data.

26. The processor-based system of claim 25, wherein, when executed, the processor-executable instructions cause the at least one processor to:

cause the alternative flight plan to be loaded to flight management computer of the particular aircraft to control the particular aircraft; and
cause the alternative flight plan to be loaded to flight management computer of the particular aircraft to control the particular aircraft.

27. The processor-based system of claim 19, when executed, the processor-executable instructions cause the at least one processor to:
access aircraft performance data for the particular aircraft, wherein to access aircraft performance data for the particular aircraft by the processor-based system, when executed, the processor-executable instructions cause the at least one processor to access an aircraft performance model that is specific to an individual aircraft, and wherein to access a flight plan for a particular aircraft, when executed, the processor-executable instructions cause the at least one processor to: retrieve the flight plan from a ground-based flight plan processor-based system that stores one or more previously filed flight plans.

28. The processor-based system of claim 19, wherein, when executed, the processor-executable instructions cause the at least one processor to:
determine an aircraft performance model for the particular aircraft based at least in part on an airline which operates the particular aircraft; and
determining a cost function based at least on the determined aircraft performance model, a determined air speed and a determined heading of the particular aircraft, wherein to determine an aircraft performance model for the particular aircraft, when executed, the processor-executable instructions cause the at least one processor to select an aircraft performance model for the particular aircraft that represents at least one of: a speed as a function of weight, a fuel burn as a function of weight, a cost of operating aircraft, a fuel savings, or another cost.

\* \* \* \* \*